US010219582B2

(12) United States Patent
Spiller et al.

(10) Patent No.: US 10,219,582 B2
(45) Date of Patent: Mar. 5, 2019

(54) PROTECTION DEVICES FOR USE IN SHOES OR OTHER PRODUCTS

(71) Applicant: TBL Licensing LLC, Stratham, NH (US)

(72) Inventors: Bert Appleton Spiller, Dover, NH (US); Denis W. Norton, Plymouth, MN (US); Stephen Douglas Ammon, Merrimac, MA (US); Brian Lee Strother, Dover, NH (US); Thomas Yeh, Newmarket, NH (US)

(73) Assignee: TBL Licensing LLC, Stratham, NH (US)

( * ) Notice: Subject to any disclaimer, the term of this patent is extended or adjusted under 35 U.S.C. 154(b) by 126 days.

(21) Appl. No.: 15/354,131

(22) Filed: Nov. 17, 2016

(65) Prior Publication Data

US 2017/0215520 A1    Aug. 3, 2017

Related U.S. Application Data

(63) Continuation-in-part of application No. 14/161,956, filed on Jan. 23, 2014, now Pat. No. 9,554,617, which
(Continued)

(51) Int. Cl.
*A43B 7/32* (2006.01)
*A43B 1/00* (2006.01)
(Continued)

(52) U.S. Cl.
CPC .............. *A43B 7/32* (2013.01); *A43B 1/0009* (2013.01); *A43B 3/0078* (2013.01); *A43B 7/144* (2013.01);
(Continued)

(58) Field of Classification Search
CPC .......... A43B 7/32; A43B 23/081; A43B 23/08; A43B 23/26; A41D 13/06; A41D 13/065;
(Continued)

(56) References Cited

U.S. PATENT DOCUMENTS

| 2,869,253 A | 1/1959 | Sachs |
| RE24,897 E | 11/1960 | Schlecht |

(Continued)

FOREIGN PATENT DOCUMENTS

| JP | 2006042869 A | 2/2006 |
| WO | 0064292 A1 | 11/2000 |

(Continued)

OTHER PUBLICATIONS

International Search Report and Written Opinion for Application No. PCT/US2012/059562 dated Mar. 20, 2013.

*Primary Examiner* — Marie D Bays
(74) *Attorney, Agent, or Firm* — Lerner, David, Littenberg, Krumholz & Mentlik, LLP

(57) ABSTRACT

A variety of devices for protecting a user's foot from injury are disclosed. In one instance, the device is an external metatarsal protection device for a shoe or boot, having a sole with a first surface for supporting a wearer's foot and a second surface for contacting a ground area, an upper affixed to the sole, and an integral toe cap. An interior surface of the upper and the first surface of the sole define a receptacle for receiving the wearer's foot. The external protection device is incorporated along an exterior surface of the upper and is positioned to protect at least a metatarsal region of the wearer's foot. In an instance, the external protection device has injection-molded first and second layers of material, with the cushioning elements formed on a surface of the first layer and a plurality of grooves defined on a surface of the second layer.

20 Claims, 33 Drawing Sheets

Related U.S. Application Data is a continuation of application No. 13/648,839, filed on Oct. 10, 2012, now Pat. No. 8,635,789.

(60) Provisional application No. 61/664,217, filed on Jun. 26, 2012, provisional application No. 61/545,317, filed on Oct. 10, 2011.

(51) Int. Cl.
    *A43B 23/02*      (2006.01)
    *A43B 23/08*      (2006.01)
    *A43B 3/00*      (2006.01)
    *A43B 7/14*      (2006.01)
    *A43B 9/04*      (2006.01)
    *A43B 13/18*      (2006.01)
    *A43B 23/22*      (2006.01)
    *B29D 35/00*      (2010.01)
    *B29D 35/14*      (2010.01)

(52) U.S. Cl.
CPC .............. *A43B 7/1445* (2013.01); *A43B 9/04* (2013.01); *A43B 13/181* (2013.01); *A43B 13/187* (2013.01); *A43B 23/026* (2013.01); *A43B 23/027* (2013.01); *A43B 23/028* (2013.01); *A43B 23/0275* (2013.01); *A43B 23/081* (2013.01); *A43B 23/087* (2013.01); *A43B 23/22* (2013.01); *B29D 35/0009* (2013.01); *B29D 35/142* (2013.01)

(58) Field of Classification Search
CPC ........ A63B 71/1225; A63B 2071/1275; A63B 2071/1283; A63B 2071/1258
USPC .......................................... 36/72 R, 77 R, 71
See application file for complete search history.

(56) References Cited

U.S. PATENT DOCUMENTS

| | | | |
|---|---|---|---|
| 2,972,824 A * | 2/1961 | Schlecht | A43B 7/32 36/72 R |
| 3,068,593 A | 12/1962 | O'Donnell | |
| 3,101,559 A | 8/1963 | Smith | |
| 3,191,321 A * | 6/1965 | Brutting | A43B 5/025 36/133 |
| 3,206,874 A | 9/1965 | Ellis | |
| 3,242,597 A * | 3/1966 | George | A43C 13/14 36/72 R |
| 3,334,427 A * | 8/1967 | Edwards | A43C 13/14 36/72 R |
| 3,470,630 A * | 10/1969 | Ott | A43C 13/14 36/72 R |
| 3,561,142 A * | 2/1971 | Streit, Sr. | A43C 13/14 36/72 R |
| 3,693,270 A | 9/1972 | Murray | |
| 3,841,004 A * | 10/1974 | Gray | A43C 13/10 36/72 R |
| 3,995,382 A | 12/1976 | Smith | |
| 4,184,273 A | 1/1980 | Boyer et al. | |
| 4,333,248 A | 6/1982 | Samuels | |
| 4,342,159 A | 8/1982 | Edwards | |
| 4,535,553 A | 8/1985 | Derderian et al. | |
| D282,599 S | 2/1986 | Frey | |
| 4,656,761 A * | 4/1987 | Lord | A43C 13/14 36/72 R |
| 4,673,605 A | 6/1987 | Sias et al. | |
| 4,908,963 A * | 3/1990 | Krajcir | A43B 7/32 36/72 R |
| D334,646 S | 4/1993 | Dissinger | |
| 5,224,277 A | 7/1993 | Sang Do | |
| 5,392,533 A | 2/1995 | Gerhartl | |
| 5,528,841 A | 6/1996 | Pozzobon | |
| 5,680,657 A | 10/1997 | Valtakari | |
| 5,711,092 A * | 1/1998 | Despres | A43C 13/14 36/133 |
| 5,782,014 A | 7/1998 | Peterson | |
| 5,878,511 A * | 3/1999 | Krajcir | A43B 7/32 36/72 R |
| 5,915,819 A | 6/1999 | Gooding | |
| D412,391 S | 8/1999 | Covatch | |
| 6,012,236 A | 1/2000 | Pozzobon et al. | |
| 6,038,790 A | 3/2000 | Pyle et al. | |
| 6,138,383 A | 10/2000 | Steinke et al. | |
| 6,161,313 A * | 12/2000 | Bisson | A43B 23/17 36/72 R |
| 6,170,174 B1 * | 1/2001 | Gesso | A43B 5/00 36/126 |
| 6,381,876 B2 | 5/2002 | Krajcir | |
| 6,389,715 B1 * | 5/2002 | Krajcir | A43B 7/32 36/72 R |
| 6,490,730 B1 * | 12/2002 | Lyden | A41D 13/0153 2/22 |
| 6,497,057 B1 | 12/2002 | Lee et al. | |
| 6,581,305 B2 | 6/2003 | Ho | |
| 6,618,962 B1 | 9/2003 | Covatch | |
| 6,631,569 B1 * | 10/2003 | Scharbius | A43B 7/32 36/136 |
| 6,752,450 B2 | 6/2004 | Carroll, III et al. | |
| 6,754,982 B2 | 6/2004 | Reed et al. | |
| 6,802,138 B2 | 10/2004 | McManus et al. | |
| 6,926,947 B1 | 8/2005 | Seckel | |
| 6,939,599 B2 | 9/2005 | Clark | |
| 7,134,223 B2 | 11/2006 | Ganon | |
| 7,305,776 B2 * | 12/2007 | Hess | A43B 7/32 36/72 R |
| D579,647 S | 11/2008 | Schoenborn et al. | |
| 7,475,497 B2 | 1/2009 | Hoffer et al. | |
| RE40,757 E | 6/2009 | Covatch | |
| D622,487 S | 8/2010 | McCarron et al. | |
| 7,774,954 B2 | 8/2010 | Hoffer et al. | |
| RE43,214 E | 2/2012 | Covatch | |
| 8,161,665 B2 | 4/2012 | Nakano | |
| 8,499,987 B2 * | 8/2013 | Fidrych | A45F 3/12 224/264 |
| 8,635,789 B2 | 1/2014 | Spiller et al. | |
| 8,661,712 B2 | 3/2014 | Aveni et al. | |
| D704,928 S | 5/2014 | Roundhouse | |
| 9,198,471 B2 * | 12/2015 | Behrend | A41D 13/0153 |
| 2001/0022039 A1 | 9/2001 | Krajcir | |
| 2001/0032398 A1 * | 10/2001 | Maritz | A43B 7/32 36/72 R |
| 2002/0017038 A1 | 2/2002 | Umezawa | |
| 2002/0188997 A1 | 12/2002 | Lyden | |
| 2003/0097768 A1 | 5/2003 | Baek | |
| 2003/0101620 A1 | 6/2003 | Reed et al. | |
| 2003/0150131 A1 | 8/2003 | McManus et al. | |
| 2009/0100722 A1 | 4/2009 | Hoffer et al. | |
| 2009/0276943 A1 | 11/2009 | Balolia | |
| 2010/0011620 A1 | 1/2010 | Nakano | |
| 2010/0275470 A1 | 11/2010 | Hoffer et al. | |
| 2010/0299967 A1 | 12/2010 | Atsumi et al. | |
| 2011/0185597 A1 | 8/2011 | Guest | |
| 2011/0247240 A1 | 10/2011 | Eder et al. | |
| 2012/0084896 A1 * | 4/2012 | Wyner | A63B 71/08 2/16 |
| 2012/0167418 A1 | 7/2012 | Frappier | |
| 2012/0233884 A1 | 9/2012 | Greene | |
| 2012/0233888 A1 | 9/2012 | Baker et al. | |
| 2012/0317836 A1 | 12/2012 | Voorhees | |

FOREIGN PATENT DOCUMENTS

| | | |
|---|---|---|
| WO | 2006017651 A1 | 2/2006 |
| WO | 2011050373 A1 | 4/2011 |

* cited by examiner

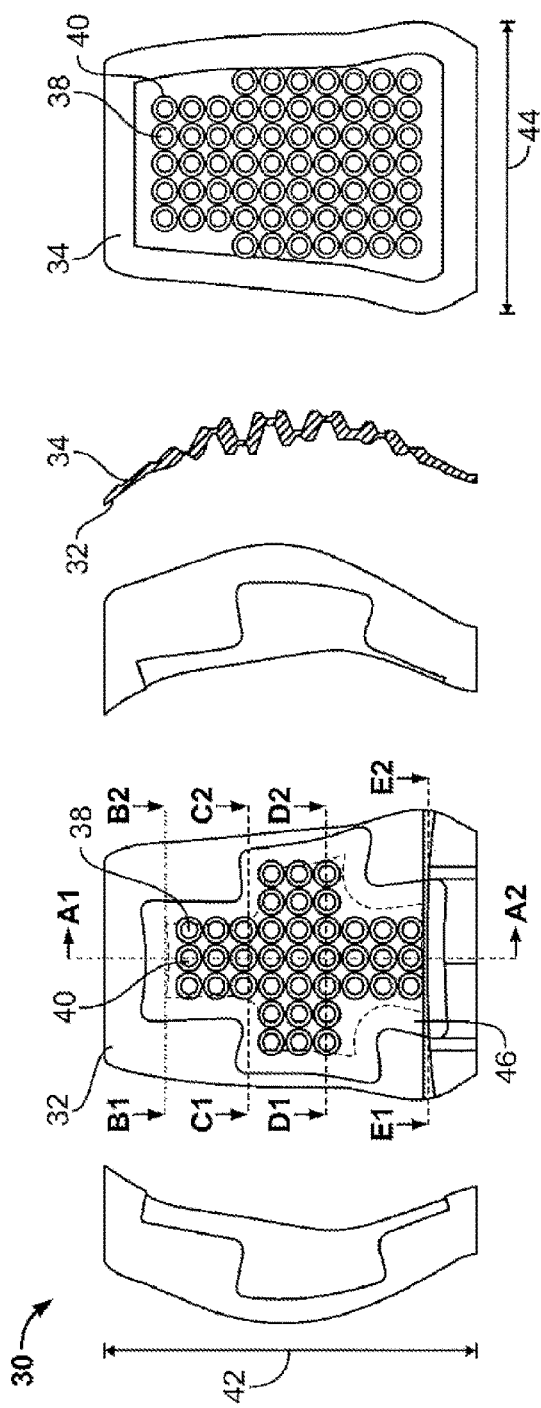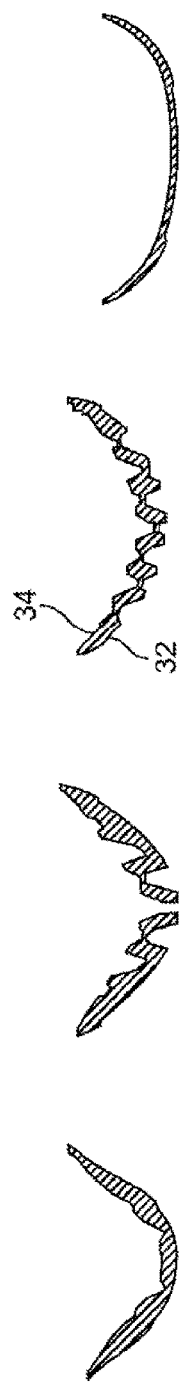

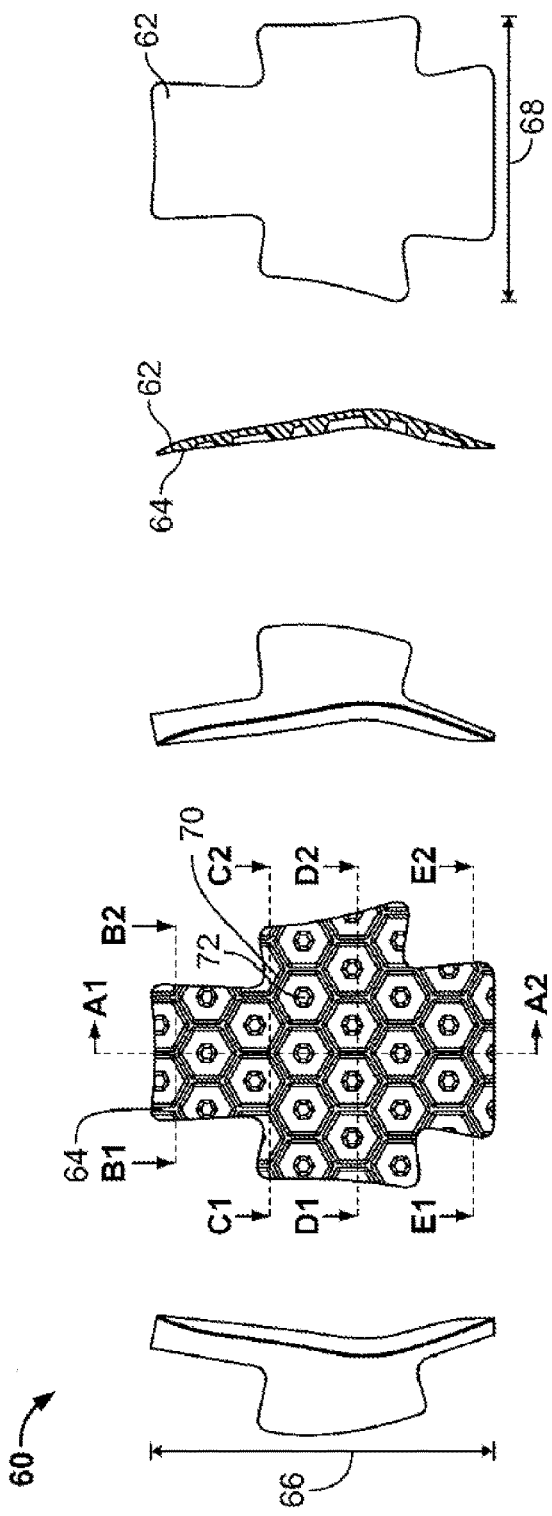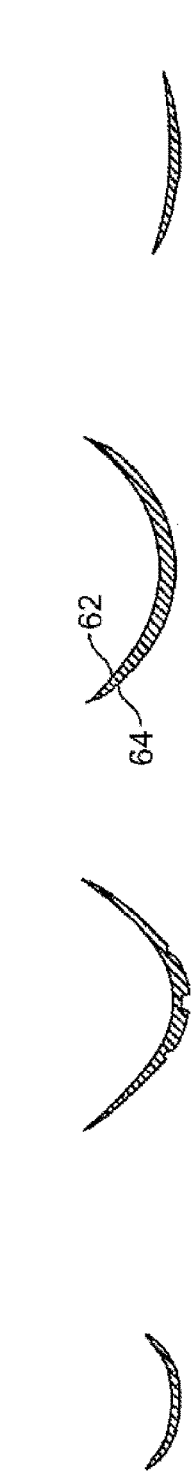

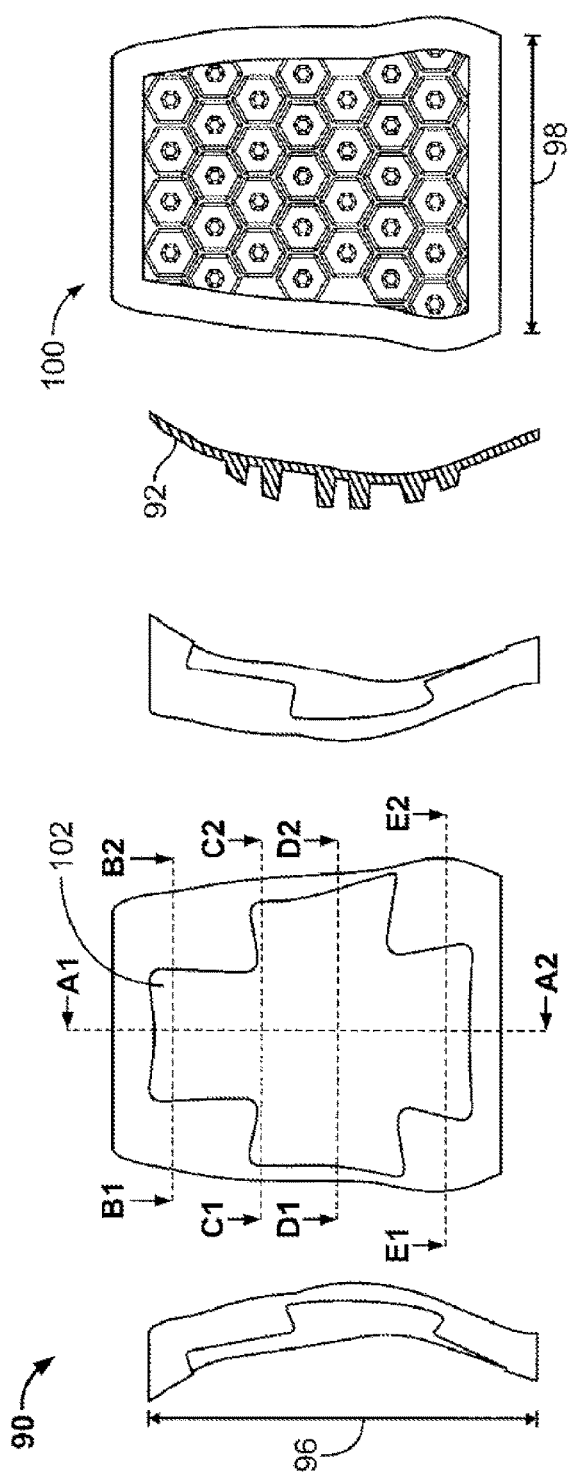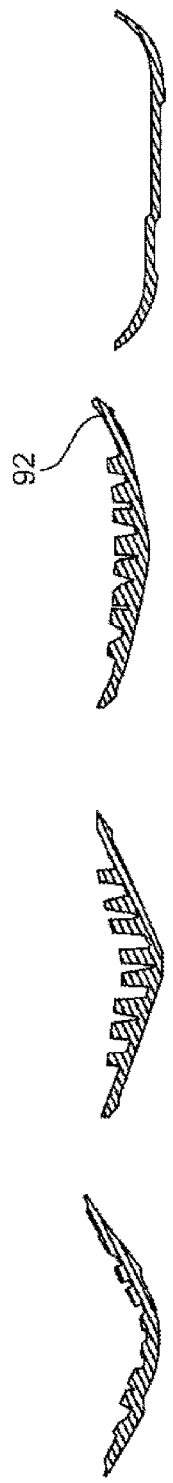

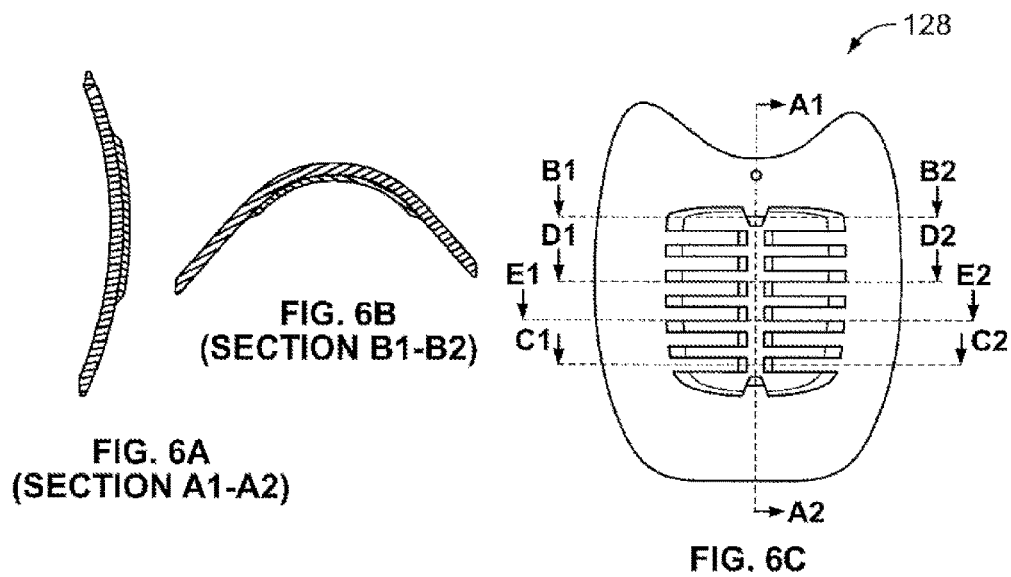
FIG. 6B
(SECTION B1-B2)
FIG. 6A
(SECTION A1-A2)
FIG. 6C
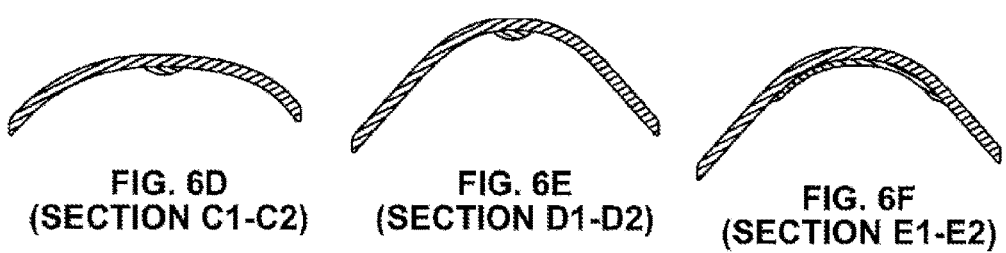
FIG. 6D
(SECTION C1-C2)
FIG. 6E
(SECTION D1-D2)
FIG. 6F
(SECTION E1-E2)
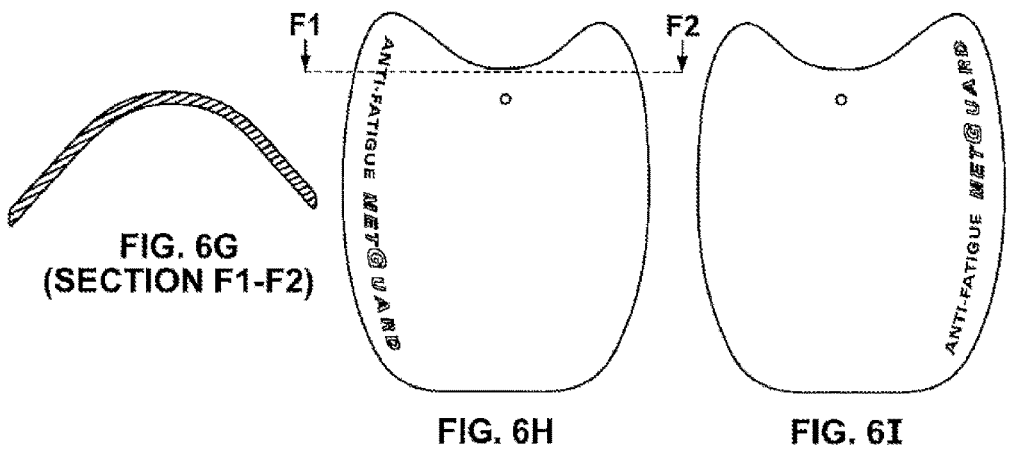
FIG. 6G
(SECTION F1-F2)
FIG. 6H
FIG. 6I

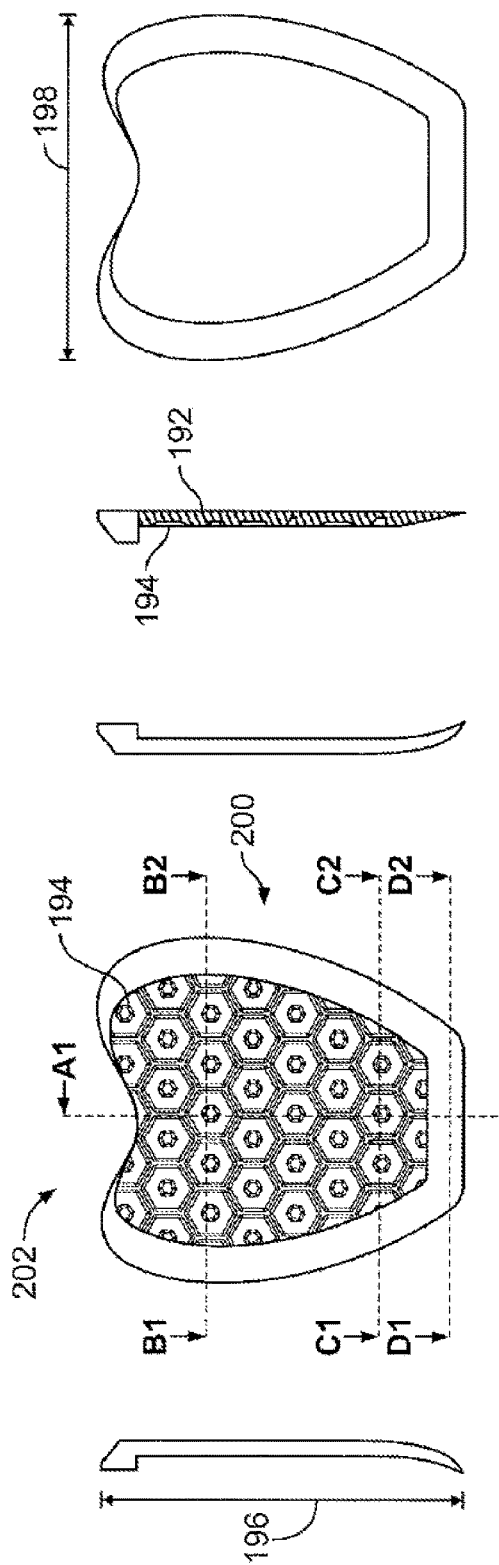

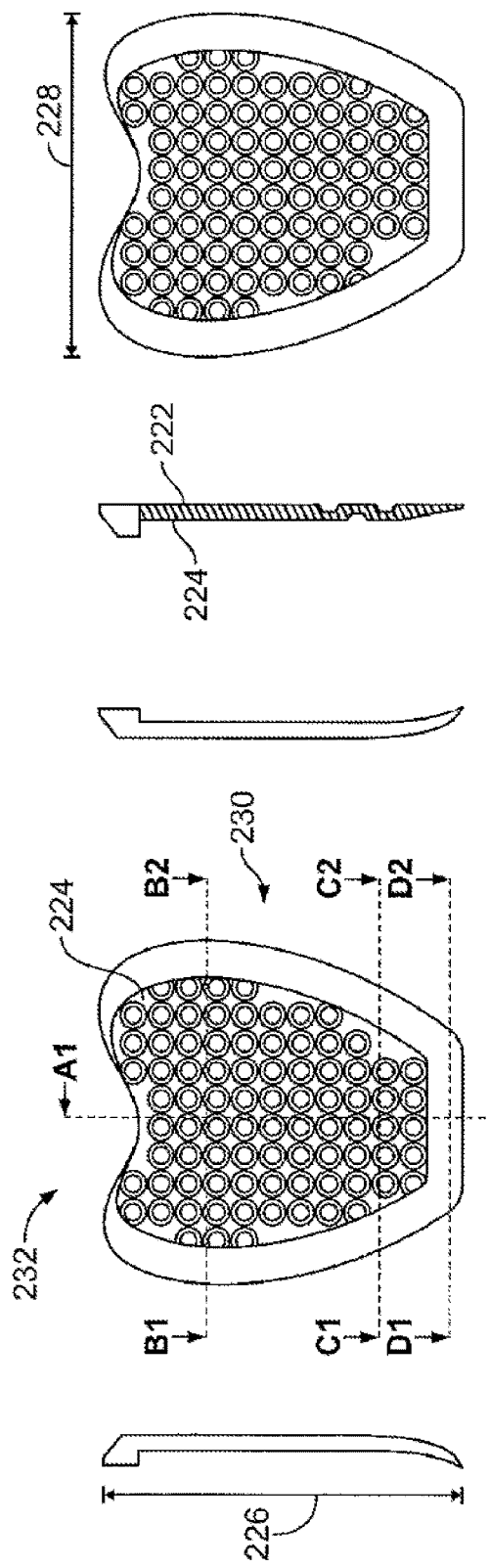

SECTION B-B'

SECTION C-C'

SECTION D-D'

SECTION E-E'

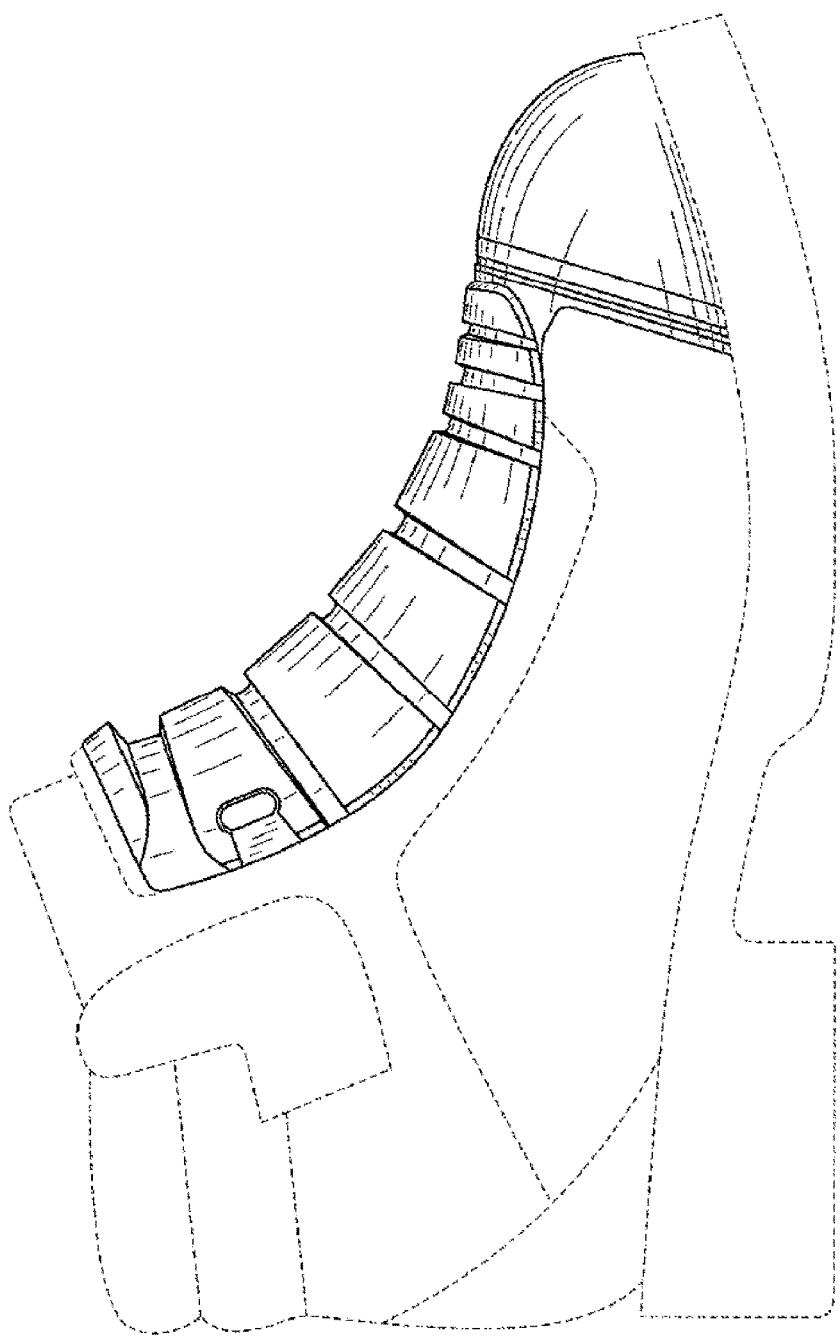

PROTECTION DEVICES FOR USE IN SHOES OR OTHER PRODUCTS

CROSS-REFERENCE TO RELATED APPLICATIONS

This application is a continuation-in-part of U.S. application Ser. No. 14/161,956, filed on Jan. 23, 2014, which application is a continuation of U.S. application Ser. No. 13/648,839, filed on Oct. 10, 2012, now U.S. Pat. No. 8,635,789, which application claims the benefit of U.S. Provisional Patent Application Nos. 61/545,317 and 61/664,217, filed, respectively, on Oct. 10, 2011 and Jun. 26, 2012, the disclosures of which are hereby incorporated herein by reference.

BACKGROUND OF THE INVENTION

Aspects of the present invention relate, in general, to protection devices for use in shoes, and specifically to metatarsal or other protection devices for shielding a user's foot from injury. Protection devices for use in shielding other areas of a user's foot, other portions of the body, or in alternate applications beyond bodily protection are also contemplated.

Protection devices for shielding the metatarsal area of the foot from injury are widely used in various sectors of the footwear industry. Typically, these protection devices are referred to as metatarsal guards, and may be employed as an external guard or integrated into the shoe itself (e.g., an internal guard). Common scenarios in which such metatarsal guards may be necessary are in construction applications, in mining, or in other like fields where the foot may be susceptible to injury due to impact with extraneous objects (e.g., falling rocks, lumber, puncture via nails, etc.) In some cases, while the aforementioned metatarsal guard(s) may provide adequate protection from injury, such guard(s) may restrict comfortable movement of the foot due to the rigidity of the guard(s). Other deficiencies not noted here also exist.

Beyond protection of the metatarsal area of the foot, other sensitive areas that are susceptible to injury may also require shielding. For example, it may be the case that the foot, in certain scenarios, requires side or heel protection instead of, or in combination with, metatarsal protection. It is not uncommon to provide such protective devices on the side or heel region of a shoe in order to provide shielding. Even these protective mechanisms, however, may suffer from several defects, and therefore lack of comfort in use. For example, some heel (or other) protective devices are unnecessarily rigid, and thereby do not adequately absorb the shock resulting from an impact or other injuring event. Stated differently, since such protective devices are unduly rigid, force generated from an impact can travel through the device and be translated to the user, resulting in injury to the user from the impact. Such rigidity also decreases comfort, and sometimes results in the protective device being overly heavy. This may also be the case for several of the metatarsal protection devices noted above.

BRIEF SUMMARY OF THE INVENTION

A first embodiment of the present invention includes an article of footwear including a sole having a first surface configured to support a wearer's foot and a second surface configured to contact a ground area, and an upper fixed to the sole. The upper includes an interior surface and an exterior surface opposite the interior surface. The interior surface and the first surface of the sole define a receptacle for receiving the wearer's foot. The article further includes an external protection device incorporated along the exterior surface of the upper. The external protection device is positioned to protect at least a metatarsal region of the wearer's foot. The article also includes a toe cap extending along a toe region of the upper and being integral with the external protection device.

In one aspect, the toe cap and external protection device are integrally formed by injection molding. In an aspect, the external protection device is formed of a first layer of material adjacent to the interior surface of the upper and a second layer of material disposed along the exterior surface of the upper. At least one of the first and second layers of material is integrally formed with the toe cap A second embodiment of the present invention includes an article of apparel including a housing sized to retain a protection device and arranged for placement adjacent to a portion of a body of a user during wear, and a protection device positioned within the housing and extending along a longitudinal axis. The protection device includes a first layer of material having first and second opposing surfaces and a series of cushioning elements formed along at least one of the first and second surfaces, and a second layer of material attached to the first layer. The second layer has a first surface and a second surface. The second surface of the second layer abuts the first surface of the first layer. The first surface of the second layer has a plurality of grooves defined thereon. The first layer is shaped to conform to the portion of the user's body such that the protection device is arranged to provide protection for the portion of the user's body against injurious events. The first and second layers injection-molded layers.

In an aspect of the second embodiment, the plurality of grooves extends along a lateral axis perpendicular to the longitudinal direction. In another aspect, a first distance between two ones adjacent of the plurality of grooves proximal to a first end of the protection device is smaller than a second distance between two adjacent of the plurality of grooves distal to the first end of the protection device. In yet another aspect, distances between two adjacent ones of the plurality of grooves increase along the longitudinal axis from a proximal end to a distal end of the protection device. In a still further aspect, a depth of each of the plurality of grooves increases along the longitudinal axis from a proximal end to a distal end of the protection device.

In an aspect, the article further includes a connecting element extending from at least one of the first and second layers and a toe cap connected to the connecting element and disposed remote from the protection device.

According to a third embodiment of the present invention, an article of apparel includes a housing sized to retain a protection device and arranged for placement adjacent to a portion of a body of a user during wear and a protection device positioned within the housing. The protection device includes a first injection-molded layer of a first material abutting a second injection-molded layer of a second material. The second layer of material includes first and second opposing surfaces. The first layer of material is shaped to conform to a portion of the user's body to provide protection against injurious events. An injection molded toe cap extends from at least one of the first and second layers.

In an aspect, the article further includes a hinge element extending between the toe cap and at least one of the first and second layers. In another aspect, a plurality of projections are defined on the toe cap. In yet another aspect, the injection molded toe cap is formed of a third material different from the first and second materials.

A second embodiment of the invention may include a shoe having an upper with top and bottom layers of material or a flap having an internal pocket, and a device for protecting the metatarsal region of a user's foot, the device being situated between the top and bottom layers of the upper or within the internal pocket. The device, in this embodiment, may comprise a first injection-molded layer of a first material, a second injection-molded layer of a second material, and an injection-molded toe cap of a third material extending from the first and second layers. The first layer is shaped to conform to the metatarsal region of the user's foot, such that the device is configured to provide protection for the metatarsal region against injurious events.

In some aspects of the embodiment, a first distance between two adjacent grooves of the series of grooves proximal to the toe cap is smaller than a second distance between two adjacent grooves of the series of grooves distal to the toe cap. In an aspect of the embodiment, a first depth of the groove proximal to the toe cap is smaller than a second depth of another of the series of grooves distal to the toe cap. In yet another aspect, distances between two adjacent ones of the series of grooves increases along the longitudinal axis from a proximal end to a distal end of the protection device.

In other aspects of either the first or second embodiment, the device may be integrally attached to the upper or the flap, or the device may be separable from the upper or the flap.

BRIEF DESCRIPTION OF THE DRAWINGS

A more complete appreciation of the subject matter of the present invention and of the various advantages thereof can be realized by reference to the following detailed description in which reference is made to the accompanying drawings in which:

FIGS. 2A-J include top, bottom, medial, lateral, and section views of an internal metatarsal guard according to another embodiment of the present invention, with FIG. 2J showing the pattern of cones formed on the internal guard of FIGS. 2A-I.

FIGS. 3A-J include top, bottom, medial, lateral, and section views of a protective layer usable with various embodiments of the present invention(s), with FIG. 3J showing the pattern of hexagons formed on the protective layer of FIGS. 3A-I.

FIGS. 4A-I include top, bottom, medial, lateral, and section views of an alternate internal metatarsal guard according to another embodiment of the present invention.

FIGS. 6A-I include top, bottom, and section views of a rigid layer forming part of the external metatarsal guard employed in the shoe of FIG. 5.

FIGS. 7A-H include top, bottom, medial, lateral, and section views of one portion of an external metatarsal guard according to an embodiment of the present invention.

FIGS. 8A-H include top, bottom, medial, lateral, and section views of one portion of an alternate external metatarsal guard according to another embodiment of the present invention.

FIGS. 10A-E include perspective, front, right lateral, left lateral, and top views of one example of an external metatarsal guard and toe cap according to aspects of the technology.

DETAILED DESCRIPTION

In describing aspects of the present invention(s), specific terminology will be used for the sake of clarity. However, the invention(s) is not intended to be limited to any specific terms used herein, and it is to be understood that each specific term includes all technical equivalents, which operate in a similar manner to accomplish a similar purpose.

Figure 1:
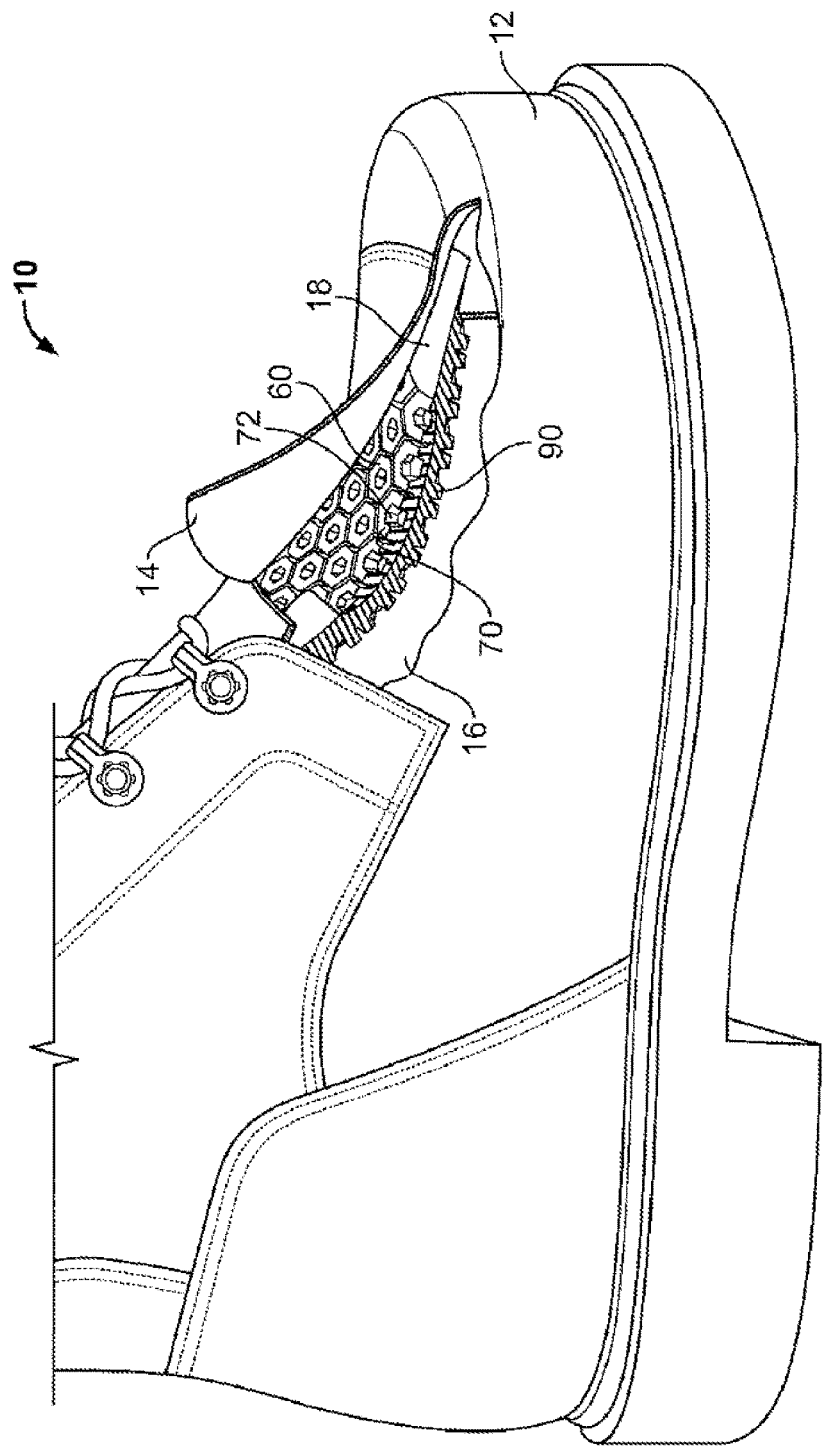
FIG. 1 is a side view of a shoe incorporating therein an internal metatarsal guard according to one embodiment of the present invention.
Figure 2J:
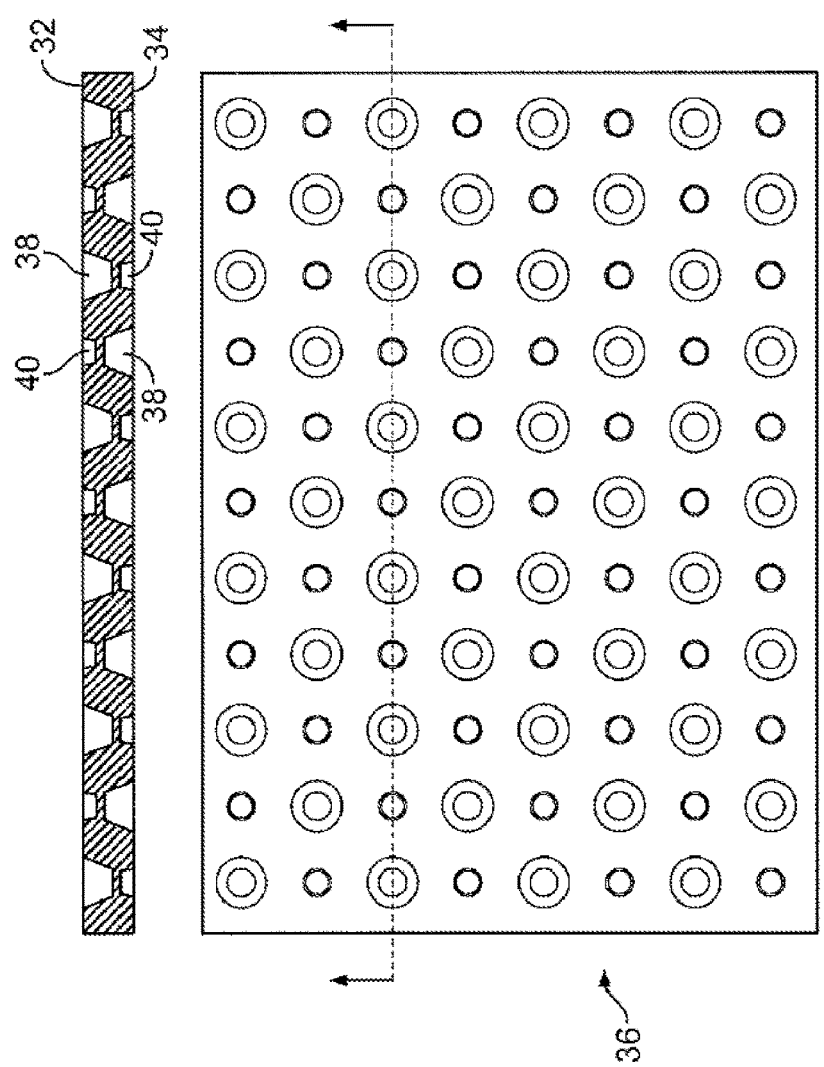

FIG. 1 depicts a shoe 10 having an internal metatarsal guard 18 according to one embodiment of the invention, such guard 18 being situated between outer 14 and inner layers 16 of an upper 12 of the shoe 10. FIG. 1, at this point, serves to merely demonstrate where the various metatarsal guards detailed hereafter may be positioned in a shoe. The detailed structure of each such metatarsal guard is as follows.

Referring to FIGS. 2A-I, an internal metatarsal guard 30 according to one embodiment of the present invention is shown, in which the guard 30 is adapted to provide improved flexibility while maintaining adequate protection for the metatarsal region of a user's foot. As with guard 18 discussed above, internal metatarsal guard 30 may be situated between outer and inner layers of an upper of a shoe (e.g., shoe 10 shown in FIG. 1) to provide protection for the foot.

In one embodiment, guard 30 may include a top surface 32 and a bottom surface 34, each surface 32, 34 having a pattern of individual cones 36 formed thereon. For example, as shown in FIGS. 2A-I, and particularly FIG. 2J, top surface 32 of metatarsal guard 30 may have a plurality of cones of one size 38 formed therein, and a plurality of cones of a relatively smaller size 40 extending into surface 32. Such cones 38, 40 may also alternate with one another in both a longitudinal direction 42 and a medial-lateral 44 direction. Likewise, a similar pattern of large 38 and relatively smaller cones 40 may be situated on bottom surface 34 of metatarsal guard 30, although the pattern 36 on bottom surface 34 may be offset from the pattern 36 on top surface 32. Stated differently, a substantially identical pattern 36 of cones 38, 40 may be situated on bottom surface 34; however, the pattern 36 on bottom surface 34 may be arranged such that a large cone 38 on surface 34 may be disposed directly opposite a small cone 40 on top surface 32, and vice versa. This is shown best in FIGS. 2D, 2G-H, and particularly FIG. 2J. It is also contemplated that the pattern(s) 36 of cones 38, 40 on top 32 and bottom 34 surfaces may, instead of containing only two (2) cones of varying size, include three (3) or more cones each having a different size. An example of such a pattern of cones is described in the Exhibits A and B.

As shown further in FIGS. 2A-I, metatarsal guard 30 may be anatomically contoured to conform to the shape of the foot. In particular, bottom surface 34 of guard 30, which may be situated against the foot during use, may be concavely shaped in the medial-lateral direction 44, and convexly shaped in the longitudinal direction 42. Thus, bottom surface 34 of guard 30 may conform to the metatarsal region of a user's foot.

In use, metatarsal guard 30 may be positioned within a shoe, similar to shoe 10 shown in FIG. 1, and may act to protect the metatarsal area of a user's foot. Thus, metatarsal guard 30 may be utilized as an internal guard in shoe 10 to protect a user's foot from falling objects or other impact events, which would otherwise injure the foot.

Other configurations of guard 30 are also contemplated. For instance, in the embodiment shown in FIGS. 2A-I, the pattern of cones 36 on top surface 32 of guard 30 may, in some instances, form a cross-shape or region 46. Alternatively, such guard 30 may have a top surface 32 without a pattern of cones formed thereon (not shown). Thus, top surface 32 of guard 30 may be relatively smooth or non-patterned. In this and other embodiments, instead of a cross-shape 46 being defined by the pattern of cones 36 on top surface 32 of guard 30, a cross-shaped recess (not shown) may be formed in guard 30.

Referring now to FIGS. 3A-I, an additional component, which is usable with internal metatarsal guard 30 (FIGS. 2A-I), is shown. The use and construction of this added component is set forth below.

As shown in FIGS. 3A-I, an added protective layer 60 may have inner 62 and outer 64 surfaces, and may be configured in a generally cross-type shape. The protective layer 60 may also be anatomically contoured to conform to the metatarsal region of the foot, similar to guard 30. Thus, inner surface 62 of protective layer 60 may be convexly shaped in a longitudinal direction 66 and concavely shaped in a medial-lateral direction 68. In a particular embodiment, inner surface 62 of protective layer 60 may also be adapted to abut top surface 32 of guard 30, such that protective layer 60 may overly guard 30. To be exact, the cross-shape of protective layer 60, as shown in FIGS. 3B and 3E, may approximate the cross-shape 46 formed on top surface 32 of guard 30 produced via cones 38, 40. Protective layer 60 may thusly overly the cross-shape 46 on top surface 32 of guard 30 produced via cones 38, 40 and provide additional impact resistant in that area.

Figure 3J:
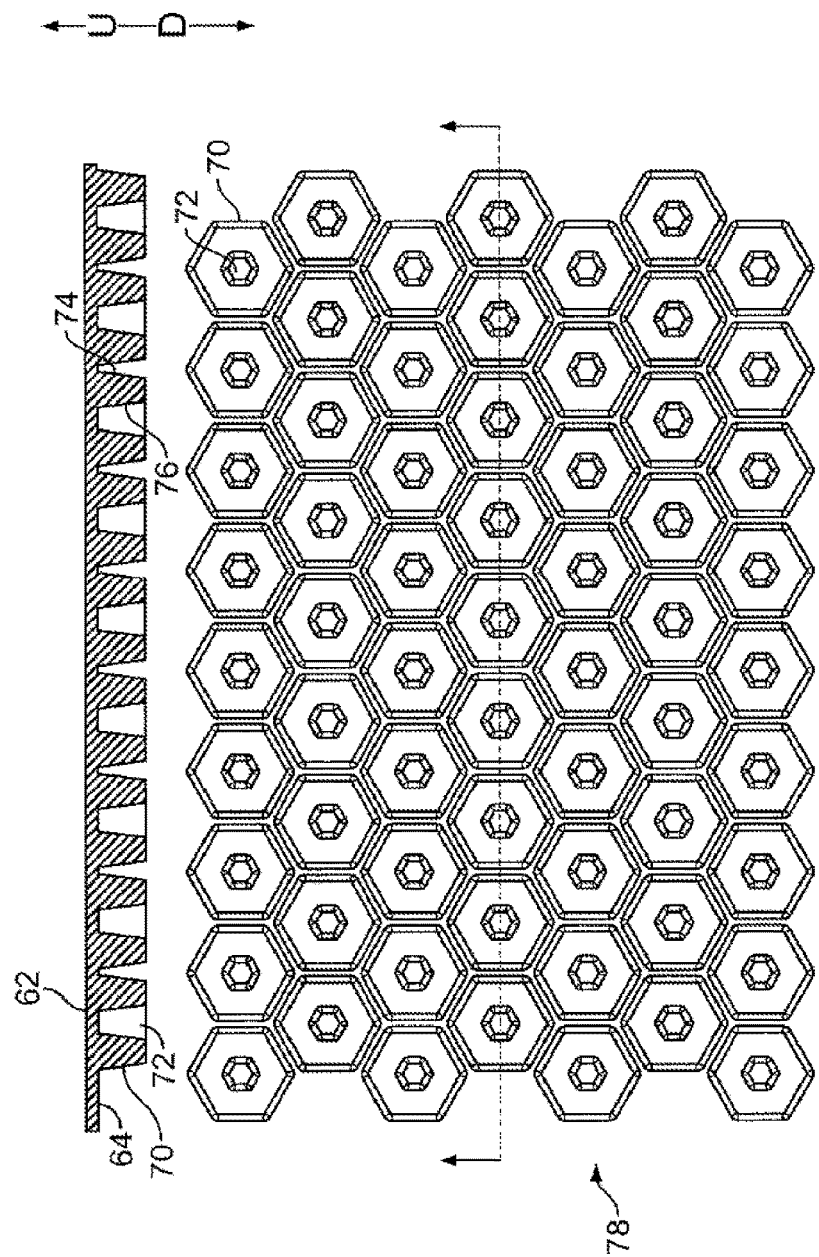

FIGS. 3B, 3D, and particularly FIG. 3J depict, in detail, a hexagonal pattern 78 formed on outer surface 64 of protective layer 60. The pattern 78 may include a series of outer hexagons 70 into which a series of respective inner hexagons 72 are formed. In other words, individual outer hexagons 70 may be situated on outer surface 64 of protective layer 60 and, formed or bored into each such outer hexagon 70, may be an individual inner hexagon 72. As shown further in FIG. 3J, walls 74, 76 of outer and inner hexagons 70, 72, respectively, may also be angled in opposition to one another. In particular, while walls 74 of outer hexagons 70 are situated such that the width of the respective hexagon 70 increases as the walls 74 approach outer surface 64, walls 76 of inner hexagons 72 achieve an opposite effect (e.g., the width of each inner hexagon 72 decreases as walls 76 approach outer surface 64). The pattern 78 of outer 70 and inner 72 hexagons may also repeat along outer surface 64, as shown in FIG. 3J (e.g., successive outer and inner hexagons 70, 72 may be situated adjacent one another on outer surface 64).

The effect of the aforementioned pattern 78 of outer and inner hexagons 70, 72 may be to allow for flexion of protective layer 60 in one direction, while creating relative rigidity when protective layer 60 is bent in an opposing direction. For example, upon bending protective layer 60 outwards according to the downward facing arrow in FIG. 3J, the layer 60 may behave or react with flexibility, as the walls 74 of outer hexagons 70 may simply diverge from one another. However, upon bending protective layer 60 inwards according to the upwards facing arrow, the layer 60 may behave or react with rigidity, since adjacent walls 74 of outer hexagons 70 may converge on one another. This inward bending may also have an effect of increasing rigidity of protective layer 60 when impacted with an extraneous object (e.g., falling debris, a piece of lumber, etc.) In other words, with protective layer 60 bent inwards, walls 74 of outer hexagons 70 may abut one another and be somewhat pre-compressed, and walls 76 of inner hexagons 72 may provide a supporting structure, which resists further deflection of outer hexagons 70 (e.g., due to the opposing angle of walls 76). As a result, upon an extraneous object striking such protective layer 60 in the inwardly-bent orientation, the outer and inner hexagons 70, 72 may cooperate to provide rigidity and protect a user's foot from the brunt of the impact.

In some instances, the inwardly-bent state of protective layer 60 described above may be the state in which layer 60 is disposed during use. To be exact, since inner surface 62 of protective layer 60 may be convexly shaped in longitudinal direction 66 and concavely shaped in medial-lateral direction 68, protective layer 60 (or more specifically the hexagonal pattern 78 on outer surface 64 thereof) may be bent inwards, at least partially. Thus, protective layer 60 may be pre-disposed in a somewhat rigid state due to inward bending, the nature of which is detailed above. Such rigid state, however, may be sufficient to absorb the forces generated by an impact event. With inner surface 62 of protective layer 60 situated against a user's metatarsal region, protective layer 60 may therefore react with rigidity should an extraneous object strike the user's foot. Further, upon extension of the user's foot (e.g., during normal walking), protective layer 60 may react with flexibility since such layer 60 would bend outwards during this movement. The dynamic nature of the hexagonal pattern 78 of protective layer 60 may therefore serve to provide rigidity in instances where it is needed (e.g., upon impact with a potentially injuring object) and flexibility in others (e.g., during normal walking).

The above-described benefits of protective layer 60 may be incorporated into internal metatarsal guard 30 through either: (1) in one embodiment, connecting inner surface 62 of such layer 60 with top surface 32 of guard 30 as shown and described with respect to FIGS. 2A-I; or (2) situating protective layer 60, in an overlying relationship, on an internal metatarsal guard 30 having a smooth or non-patterned top surface 32. In other words, with respect to embodiment (2), protective layer 60 may be situated on a top surface 32 of guard 30 that does not have an alternating cone pattern 36 (e.g., such guard would have a relatively smooth or non-patterned surface). With respect to embodiment (1), protective layer 60 may be situated over the cross-shape pattern 46 produced via cones 38, 40 on top surface 32 of guard 30. Accordingly, there are at least three (3) embodiments of internal metatarsal guard 30 contemplated by the present invention, such embodiments being: (1) the internal metatarsal guard 30 discussed with reference to FIGS. 2A-I; (2) embodiment (1) discussed above (i.e., internal metatarsal guard 30 of FIGS. 2A-I with an overlying protective layer 60); and (3) embodiment (2) detailed above (i.e., internal metatarsal guard 30 having a smooth or non-patterned top surface 32 and a protective layer 60 overlying such surface).

In use, each of the aforementioned embodiments (1) to (3) of internal metatarsal guard 30 may be situated between outer and inner layers of an upper of a shoe, such as shoe 10 of FIG. 1. Thus, much like the use of the internal metatarsal guard 18 discussed above, embodiments (1) to (3) of guard 30 may provide protection for the metatarsal region of a user's foot. However, such guard(s) 30 may also provide increased flexibility and improved rigidity. In particular, the impact forces potentially experienced during use of shoe 10 may be mitigated and absorbed via guard(s) 30.

A further embodiment metatarsal guard 90 is shown in FIGS. 4A-I. This guard 90, like guard(s) 30, may be anatomically contoured to a user's foot, in that a bottom surface 92 of the guard 90 may be convex in a longitudinal direction 96 and concave in a medial-lateral direction 98. It is also contemplated that metatarsal guard 90 may be situated between outer and inner layers of an upper of a shoe to provide protection against impact or other injuring events, and to absorb the forces generated by such events. Indeed, metatarsal guard 90, while usable by itself in some embodiments, is one component of the internal metatarsal guard 18 shown in shoe 10 of FIG. 1.

In a particular embodiment, a pattern of hexagons 100 may be situated on bottom surface 92 of metatarsal guard 90, such pattern 100 being identical to the pattern 78 shown and described with reference to FIGS. 3B, 3D, and particularly FIG. 3J. Thus, bottom surface 92 of guard 90 may provide protection for the metatarsal region of a user's foot in a similar way to protective layer 60. For example, it is contemplated that the pattern of hexagons 100 on bottom surface 92 of guard 90 may be inwardly-bent in the manner described in preceding sections, thereby adapting guard 90 to provide protection akin to protective layer 60. Stated differently, as metatarsal guard 90 may be inwardly-bent in its normal orientation, such guard 90 may react with relative rigidity if impacted with an extraneous object (e.g., the pattern of hexagons 100, and specifically the walls of each individual hexagon, may converge on one another once inwardly bent, and thereby provide a relatively rigid but absorptive surface with which to protect a user's metatarsal region). The rigid nature of hexagons 100 when situated in an inwardly-bent orientation is described in detail with respect to protective layer 60.

A variant of metatarsal guard 90 may include guard 90 with a protective layer 60, as shown and described with reference to FIGS. 3A-J, and FIG. 1. Such layer 60 may be situated in a cross-shaped recess 102 formed in guard 90, thereby positioning inner surface 62 of protective layer 60 against the user's foot, and outer surface 64 away from the foot. With protective layer 60 added as a component to metatarsal guard 90, such guard 90 may experience improved impact resistance and thereby provide even further protection for a user. In one embodiment, protective layer 60 may be cemented or otherwise adhered to cross-shaped recess 102 formed in guard 90, providing positive impact resistance in that area. Indeed, the above-described embodiment is shown in FIG. 1 as metatarsal guard 18 (i.e., metatarsal guard 18 comprises guard 90 with a protective layer 60 overlying such guard 90).

Figure 5:
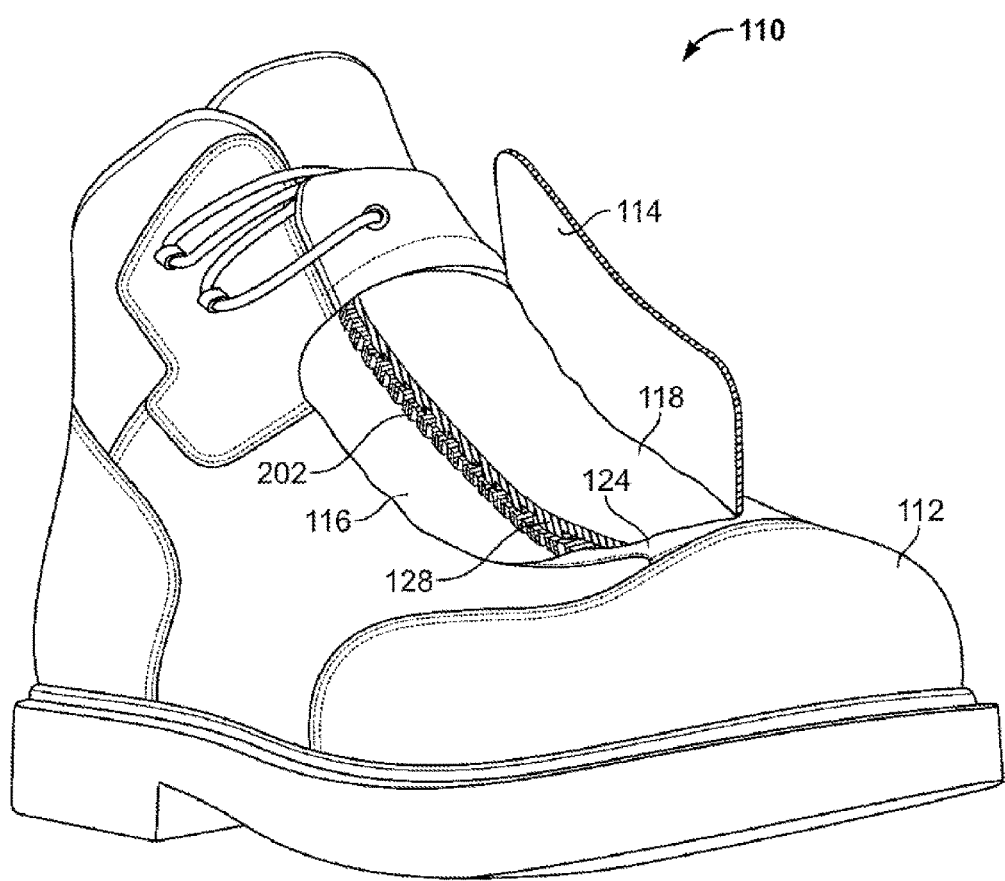
FIG. 5 is a side view of a shoe incorporating therein an external metatarsal guard according to an embodiment of the present invention.

FIG. 5 depicts a shoe 110 (similar to shoe 10), except that shoe 110 includes an external metatarsal guard 118 according to an embodiment of the invention. Such guard 118, in FIG. 5, is situated between outer 114 and inner 116 layers of a flap 124 connected to an upper 112 of the shoe 110. As shown, flap 124 may be situated over the metatarsal area of a user's foot to provide protection therefor. Guard 118 may generally include a foam or cushioning layer (described below) and an overlying rigid layer 128, the latter being shown in detail in FIGS. 6A-I and serving to provide resistance against impact forces experienced during normal use of shoe 110. External guard 118 may also conform (at least partially) to the anatomy of a user's foot in that such guard 118 may be convex in a longitudinal direction and concave in a medial-lateral direction.

FIGS. 7A-H depict an embodiment of one component 202 of external metatarsal guard 118, such component 202 being usable with shoe 110, as shown in FIG. 5. This flexible component 202 (FIGS. 7A-H) may include a top surface 192 and a bottom surface 194, the bottom surface 194 being relatively straight (or in some embodiments slightly convex) in a longitudinal direction 196, and concave in a medial-lateral direction 198. Further, bottom surface 194 may include a pattern of hexagons 200, such pattern 200 being identical to the patterns 78, 100 found on protective layer 60 (FIGS. 3A-J) and internal metatarsal guard 90 (FIGS. 4A-I), respectively. Thus, flexible component 202 of metatarsal guard 118 may offer the same or similar protective features as found with protective layer 60 and metatarsal guard 90.

In a particular embodiment, bottom surface 194 of flexible component 202 may be situated against a user's foot, thereby resulting in inward bending of the component 202 (or more specifically the pattern of hexagons 200). In other words, due to the concave curvature of bottom surface 194 of component 202 in the medial-lateral direction 198, such component 202 may be inwardly bent once situated against a user's foot. Flexible component 202 of guard 118, in this inwardly-bent state, may therefore offer the protective qualities noted above with respect to protective layer 60 and/or internal guard 90.

It is also contemplated that top surface 192 of flexible component 202 may be adhered or cemented to an overlying rigid layer 128, such as that shown in FIGS. 6A-I, to complete external metatarsal guard 118. This construct (external guard 118—or flexible component 202 with rigid layer 128) may also be situated within a flap 124 of a shoe, such as shoe 110 of FIG. 5. Indeed, flap 124 may contain a pocket for housing external guard 118. Such guard 118 may therefore serve to protect a user's foot from injury due to impact or other like events.

Referring now to FIGS. 8A-H, a component 232 of an alternate external metatarsal guard is shown, such guard also being usable within a shoe similar to shoe 110 of FIG. 5. The flexible component 232, in this embodiment, may include top 222 and bottom 224 surfaces that are curved in the same or a similar manner as surfaces 192, 194 of external guard 118. Thus, bottom surface 224 may be relatively straight (or convexly curved, in one embodiment) in a longitudinal direction 226, and concave in a medial-lateral direction 228. Further, top 222 and bottom 224 surfaces of component 232 may include a pattern of cones 230, such pattern 230 being identical to or sharing attributes with the pattern 36 of cones 38, 40 on internal metatarsal guard 30. Flexible component 232 may therefore offer the same or similar protective qualities as internal metatarsal guard 30, although being constructed for use in an external metatarsal guard.

As with external guard 118, flexible component 232 of FIGS. 8A-H, which acts as one component of the aforementioned external guard, may be cemented or otherwise adhered to rigid layer 128 of FIGS. 6A-I to complete the external guard. In particular, rigid layer 128 may be cemented or otherwise adhered to top surface 222 of flexible component 232 so as to provide increased impact resistance for the metatarsal region of a user's foot. This construct (the external guard—or flexible component 232 with rigid layer 128) may be situated within flap 124 of shoe 110 during use. To be exact, the external guard of the aforementioned embodiment may be situated within a pocket in flap 124. Accordingly, such external guard may be utilized in much the same manner as guard 118 for protection of a user's metatarsal region; and thus, such use is not explicitly detailed here.

Figure 9A:
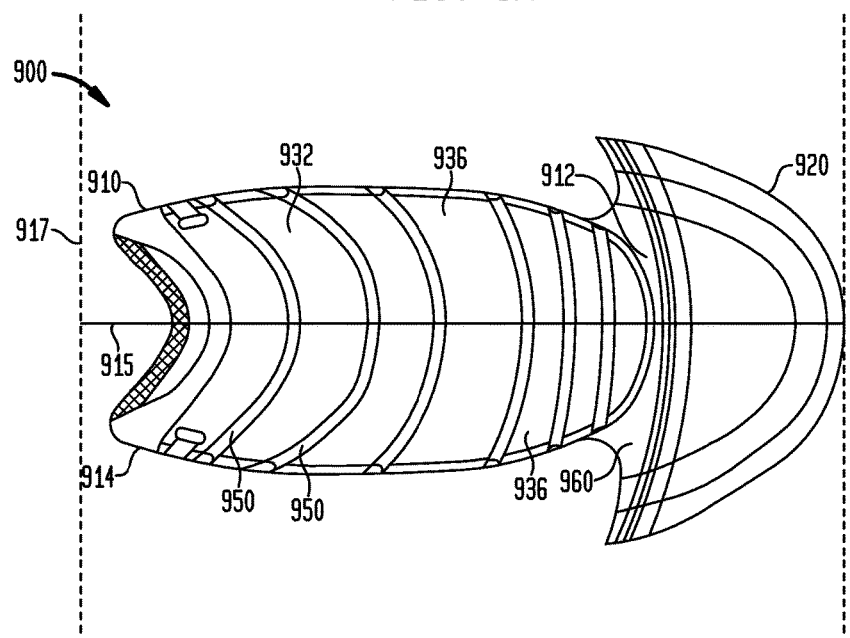
FIGS. 9A-I include top, bottom, medial, lateral, and section views of an injection-molded metatarsal guard and toe cap according to aspects of the present invention.
Figures 9B, 9C:
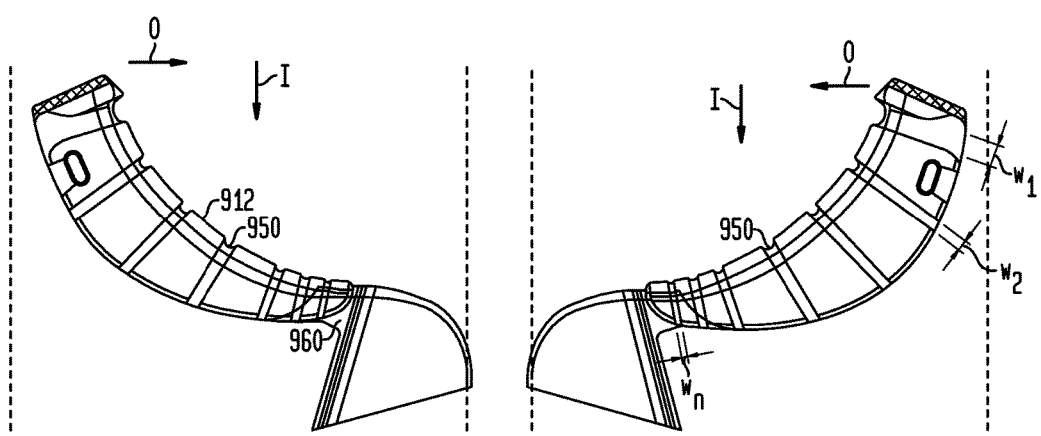

Now referring to FIGS. 9A-I, an alternate arrangement for a protective device 900 is illustrated. The protective device 900 includes a metatarsal guard 910 and a toe cap 920 formed as an integral unit, for example, via injection molding. The metatarsal guard 910 extends along a longitudinal axis 915 and has a convex shape along the longitudinal axis as shown in FIGS. 9B-C, and a concave shape along a lateral axis 917 as shown in the cross-sectional views 9F-I, so that the arrangement generally conforms to the shape of a foot, for example. The lateral axis 917 is perpendicular to the longitudinal axis 915.

Figure 9D:
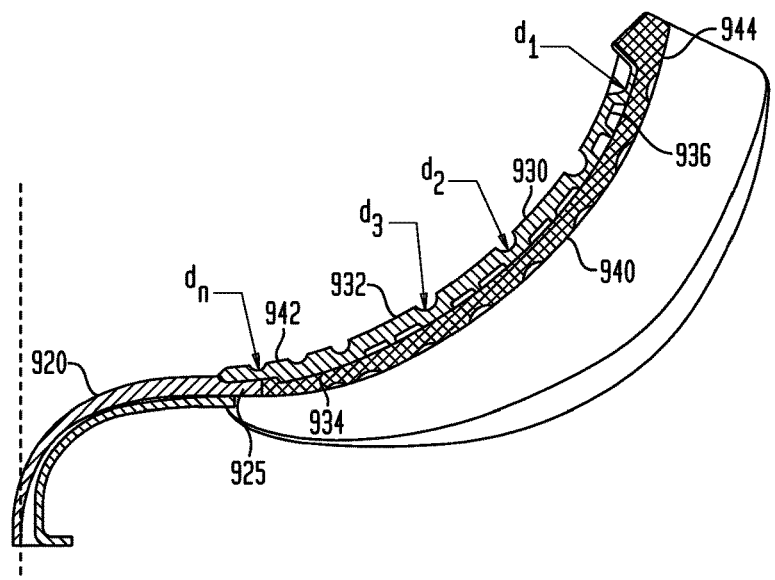
Figure 9E:
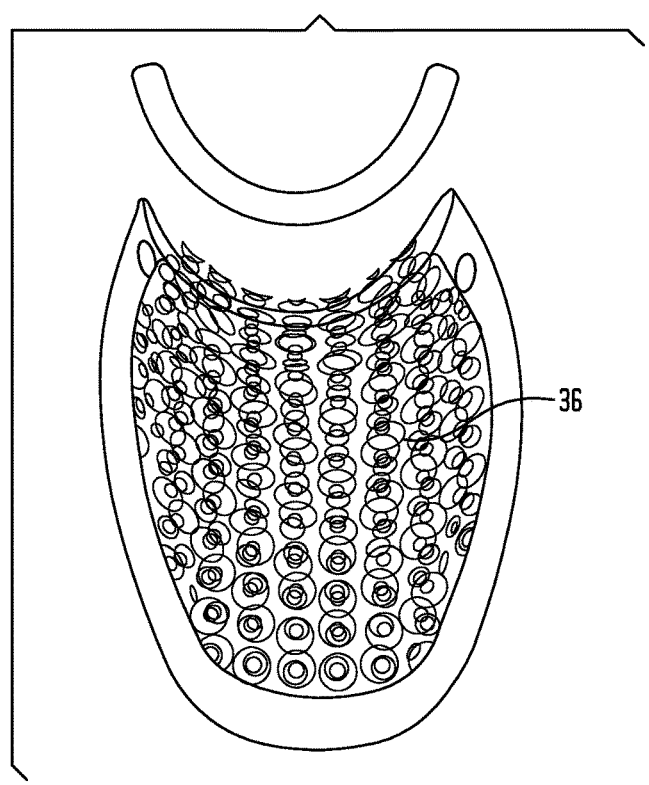
Figure 9F:
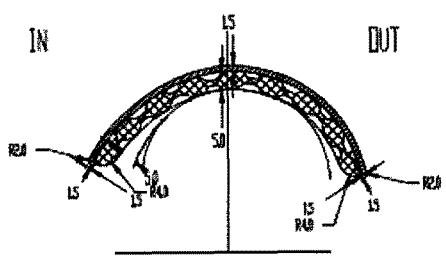
Figure 9G:
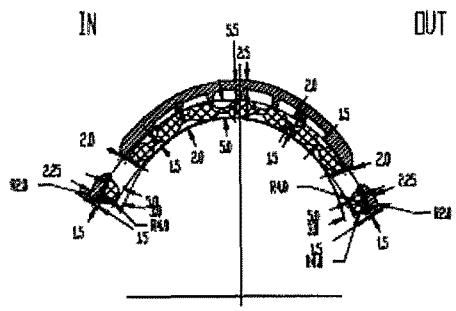
Figure 9H:
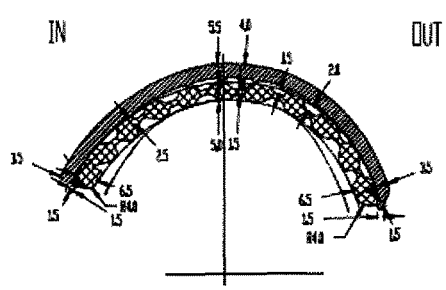
Figure 9I:
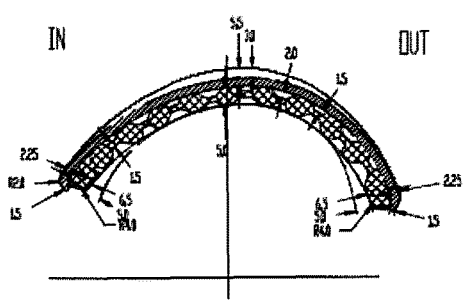

In an exemplary embodiment illustrates by the cutaway view of FIG. 9D, the metatarsal guard 910 includes a first layer 930 having a first surface 932 and a second surface 934, and a second layer 940 having a first surface 942 and a second surface 944. The first surface 942 of the second layer 940 abuts the second surface 934 of the first layer 930. In an embodiment, the second layer 940 may be cemented or otherwise permanently affixed or bonded to the first layer 930.

In one scenario, an end 925 of the toe cap is sandwiched between the first layer 930 and the second layer 940. The first layer 930 may be made of a first thermoplastic polyurethane, the second layer 940 may be made of a polyurethane, and the toe cap 920 may be made of a second thermoplastic polyurethane. Depending on the requirements of a given application, the first and second thermoplastic polyurethane may be the same material or may be different materials from one another. Other arrangements of materials may also be employed.

In one aspect, the guard 910 and the toe cap 920 are manufactured as a unitary component using injection molding and open pouring techniques with polymer based adhesive assembly. As a unitary component, the metatarsal guard 910 and the toe cap 920 are connected to one another by a connecting hinge-like element 960 extending therebetween. The hinge-like element 960 is unitarily molded with at least one of the first layer 930 and the second layer 940. An advantage of the unitary construction of the protective device 910 is that a gap or other discontinuity between the metatarsal guard 910 and the toe cap 920 is prevented by the connecting element 960. By preventing such a gap or other discontinuity, the connecting hinge-like element 960 provides additional protection to the foot, not available where the metatarsal guard and the toe cap are two distinct components. Still further, another advantage is that an impact force, for instance near the proximal end 920 on the metatarsal guard 910 is distributed also to the toe cap 920 via the connecting hinge-element 960, thereby further protecting the foot of a wearer.

A series of grooves 950 (see FIG. 9A) are defined on the first surface 932 of the first layer, dividing the first surface 932 into a plurality of pads 936. While the grooves 950 are illustrated are as having a generally semi-circular cross-section, it will be understood that the grooves of other cross-sectional shapes are also included within the scope of the present invention. An advantage of the grooves 950 is that if a force is exerted in the direction shown by arrows O (see FIGS. 9B-C), for example, by a foot within a shoe containing the protective device 900, two adjacent pads 936 will converge or otherwise move toward one another, thereby providing flexibility to the first layer 930. On the other hand, if a force is exerted in the direction shown by arrows I (see FIGS. 9B-C), for example, because of a falling object, the force from the object would be spread by the corresponding pad(s) to the underlying second layer 940, thereby absorbing the impact and protecting the foot.

In one example, a depth d of the grooves 950 ranges from about 1.0 millimeter (mm) to about 5.5 mm. In the illustrated embodiment, the groove 950 proximal to the toe cap 920 has a depth do one the order of about 1.0 mm and the groove 950 most distal to the toe cap 920 has a depth dl of about 5.5 mm, for instance +/−20%. Still further, in the illustrated embodiment, the depths of the grooves 950 increase from a proximal end 912 of the guard 910 to a distal end 914 of the guard 910. In alternate embodiments, the grooves 950 may have a uniform depth or some other pattern of depths. In a case where the grooves 950 have a non-circular cross-section, the depth d as well as the width w of such grooves 950 may also vary from one end of the guard 910 to the other end of the guard 910. Still further, the grooves 950 may have a uniform cross-sectional shape from a medial end to a lateral end. In other examples, the grooves 950 may have a non-uniform cross-sectional shape from the medial end to the lateral end.

In one scenario, a first distance between two adjacent grooves 950 proximal to the toe cap 920 is smaller than a second distance between two adjacent grooves 950 distal to the toe cap 920. As illustrated, the distances between two adjacent grooves 950 increase along the longitudinal axis 915 from the proximal end 912 to the distal end 914 of the guard 910.

The second surface 934 of the first layer 930 includes a plurality of recesses 936 defined thereon. In one embodiment, the second layer 940 may be similar to guard 30 illustrated in FIG. 2J with a pattern of cones 36 defined thereon. In another embodiment, the second layer 940 may be similar to guard 60 illustrated in FIG. 3J. Other embodiments may include a combination of the patterns from FIGS. 2J and 3J.

Figure 10A:
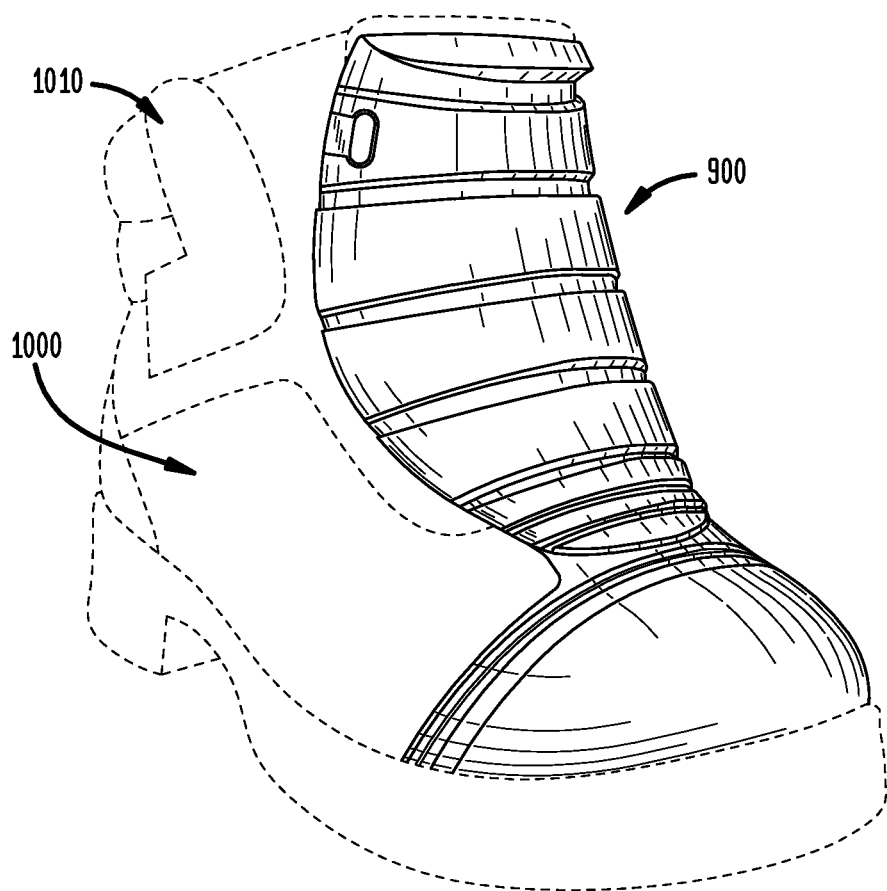
Figure 10B:
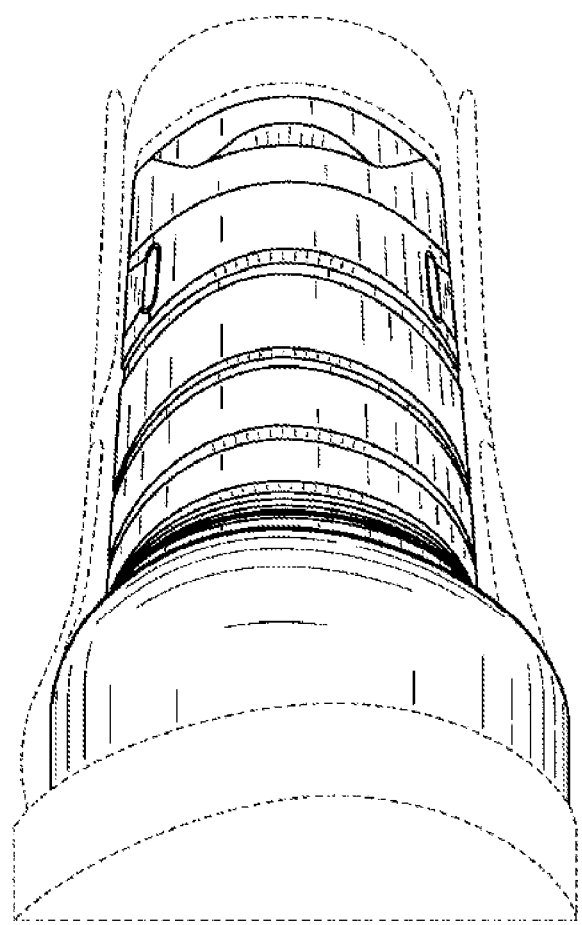
Figure 10D:
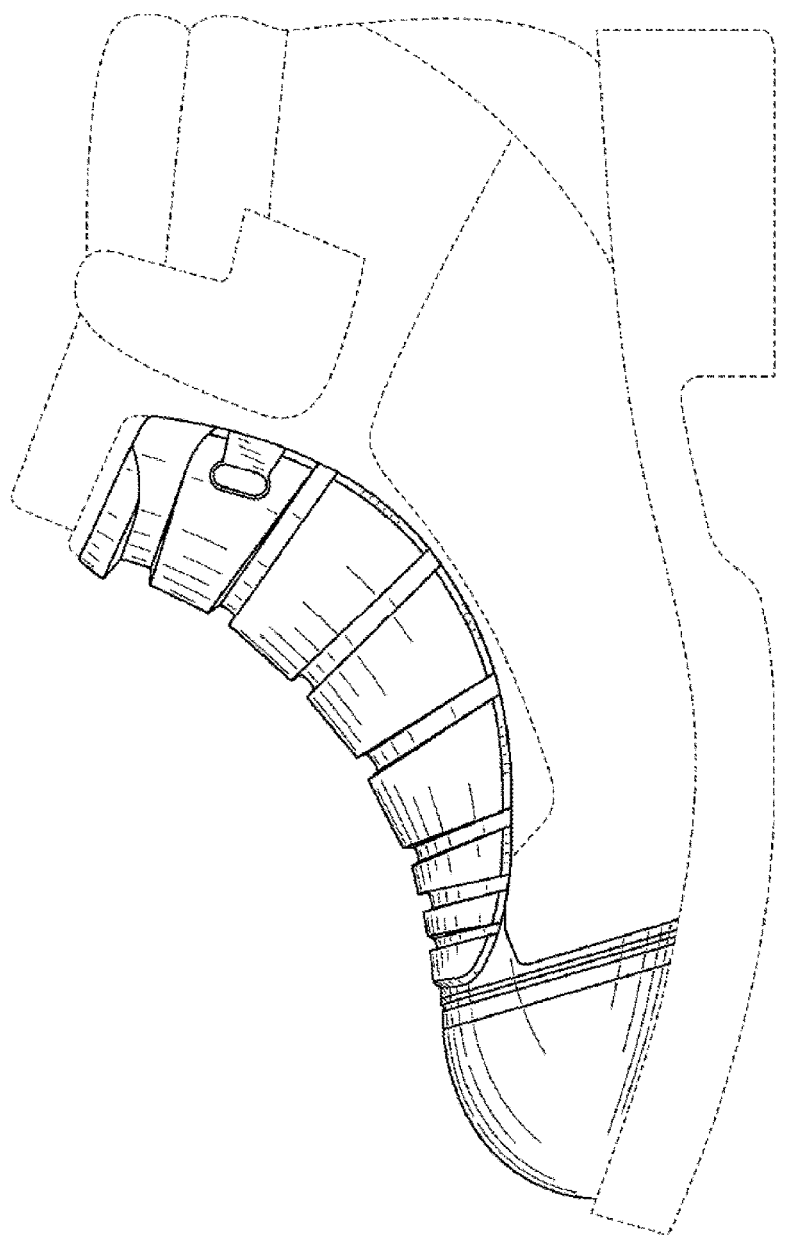
Figure 10E:
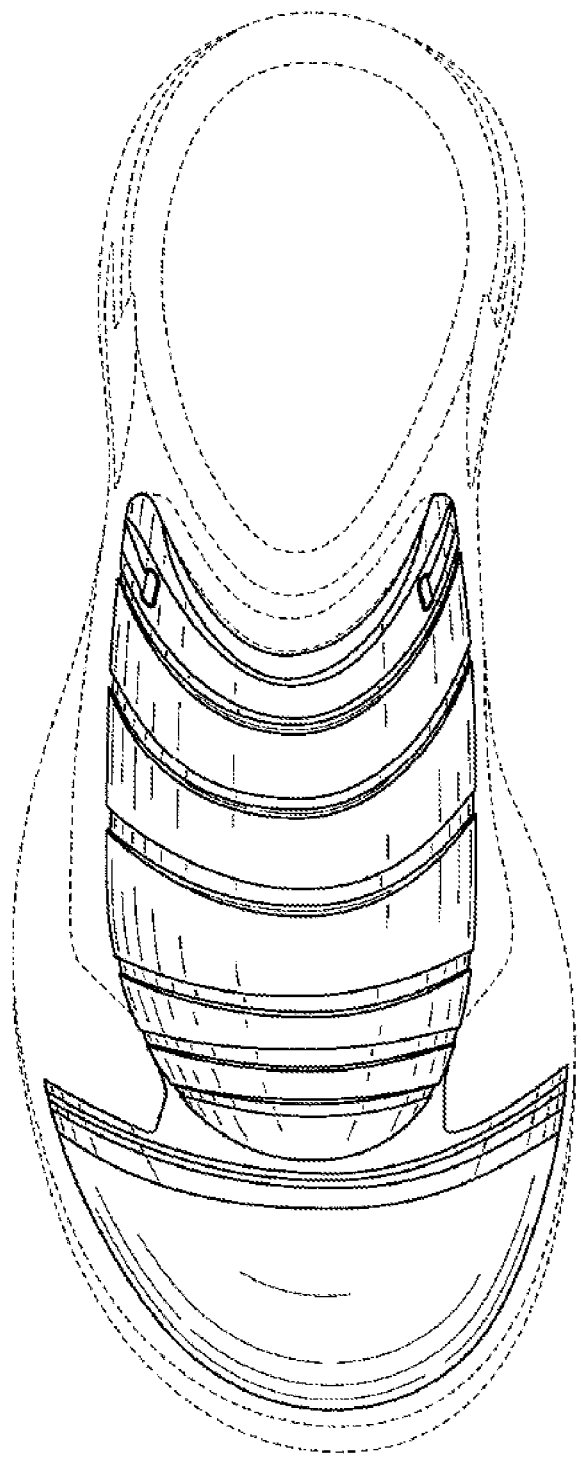
Figure 11A:
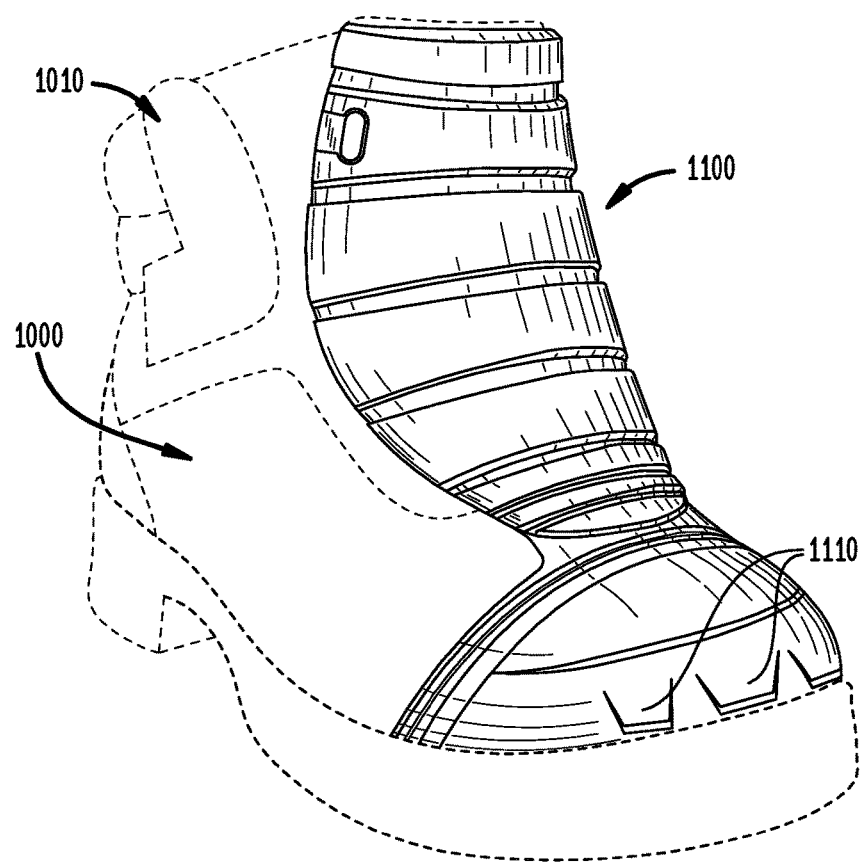
FIGS. 11A-E include perspective, front, right lateral, left lateral, and top views of another example of an external metatarsal guard and toe cap according to aspects of the technology.
Figure 11B:
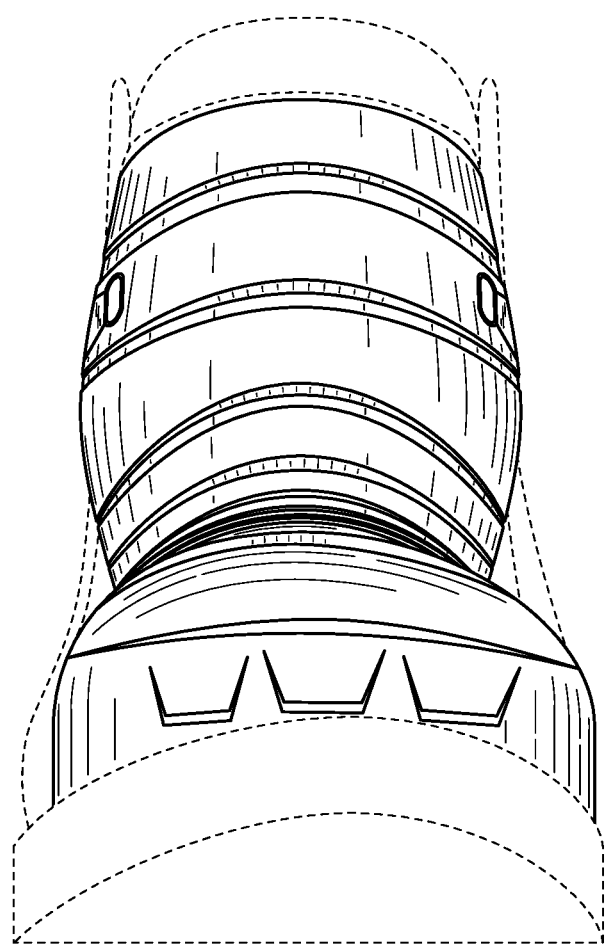
Figure 11C:
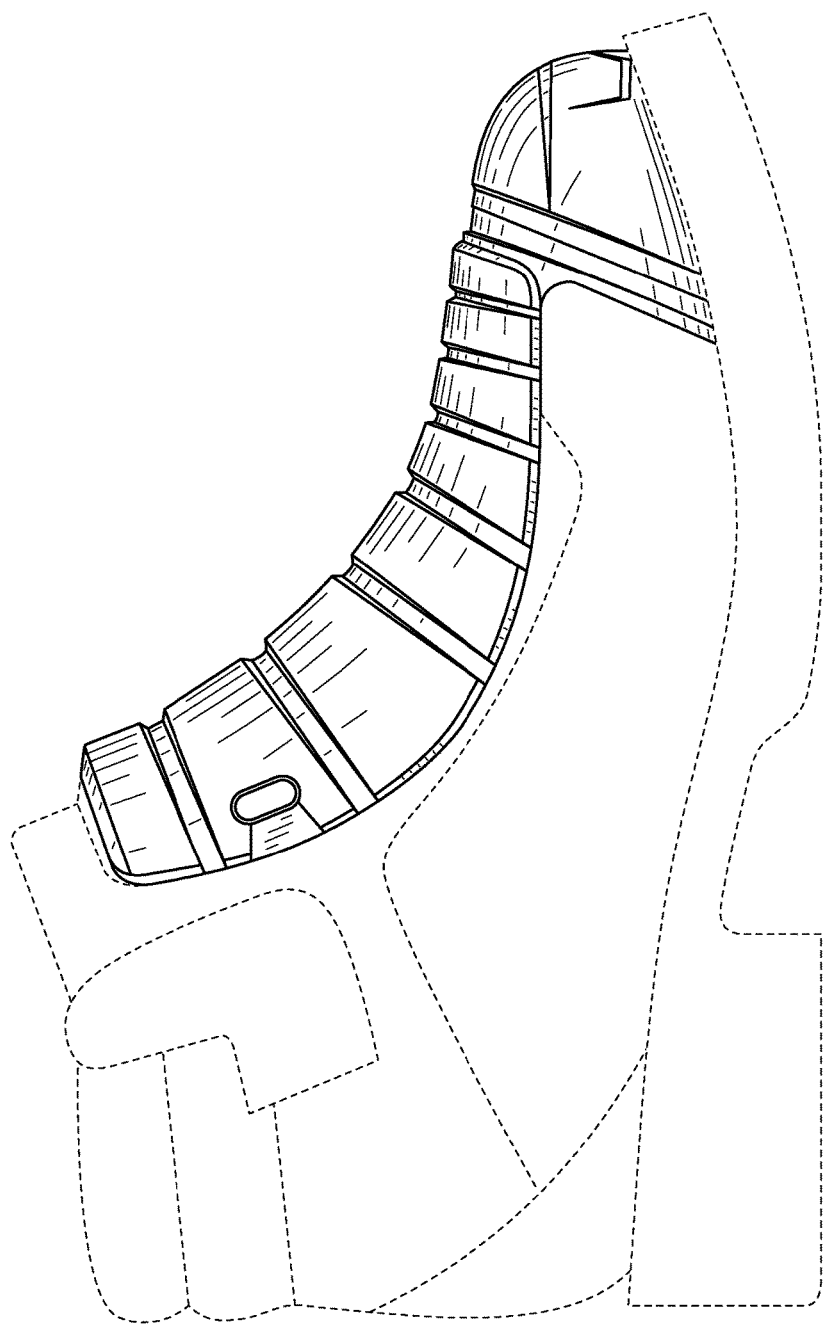
Figure 11D:
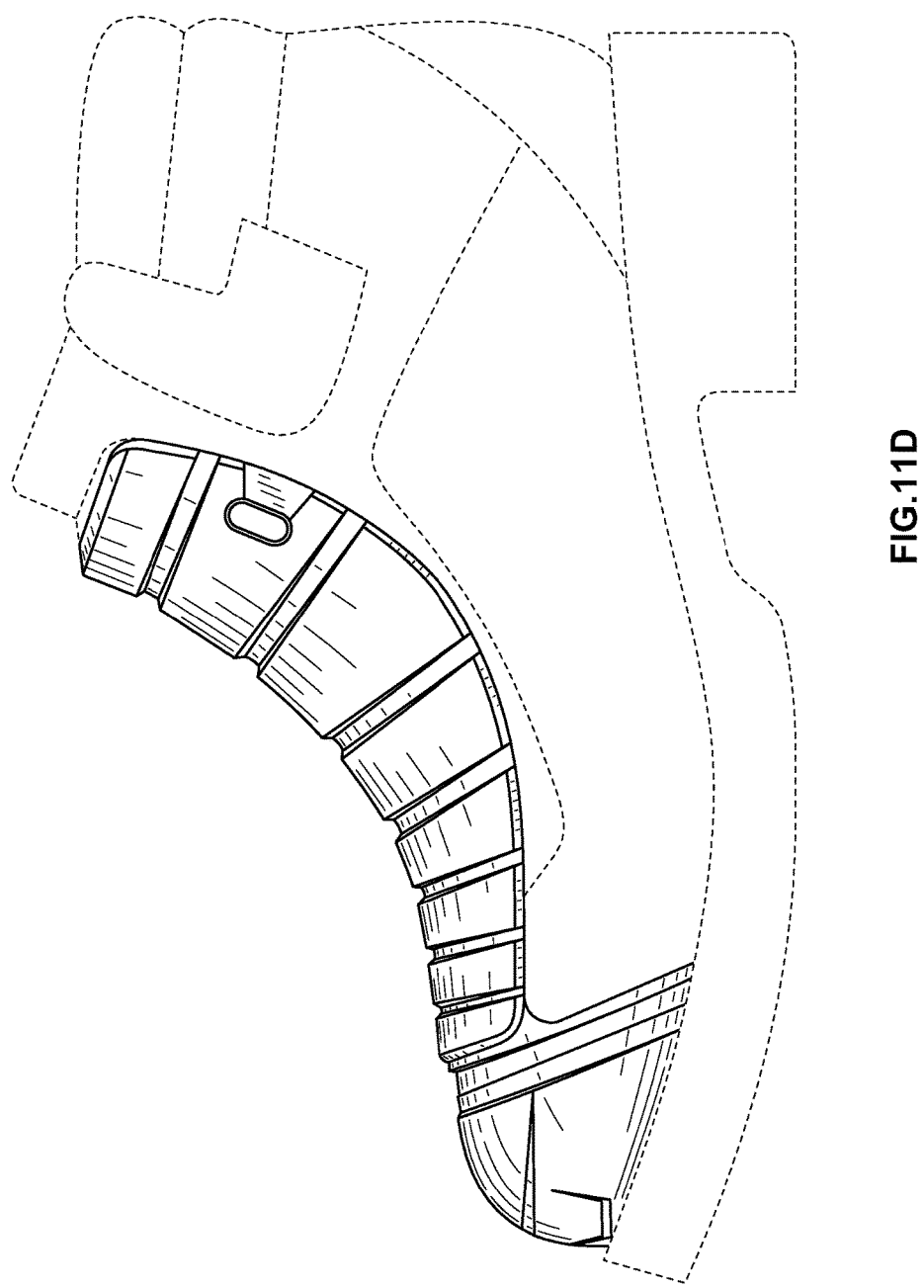
Figure 11E:
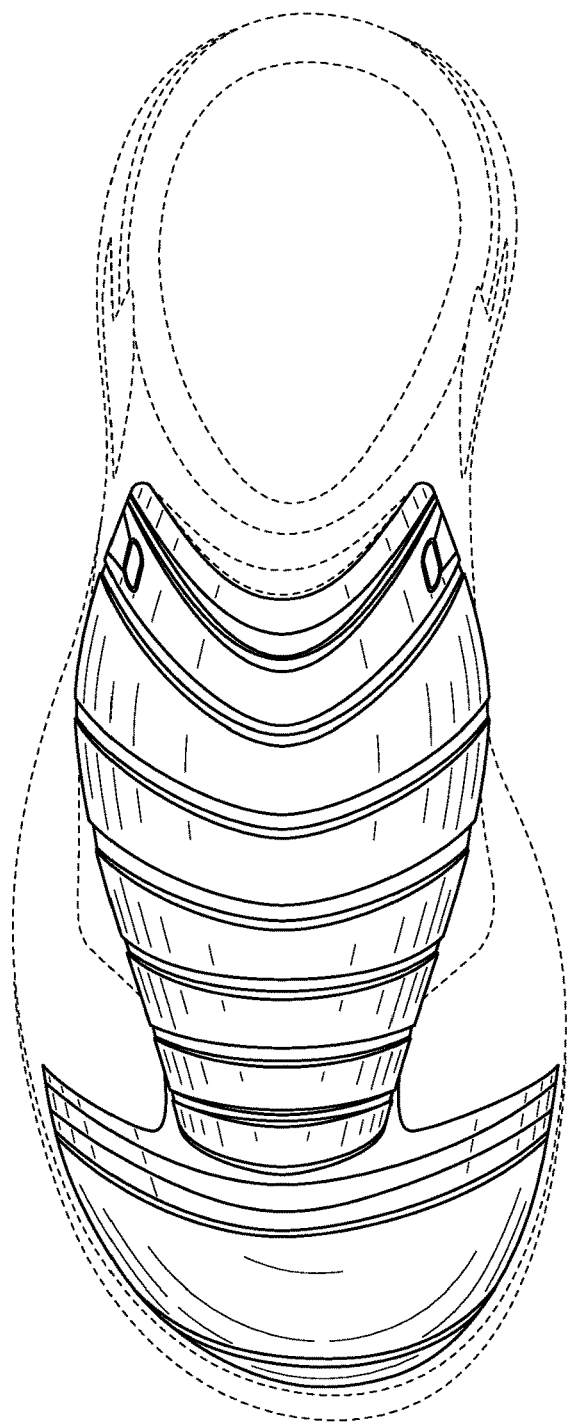
Figure 12A:
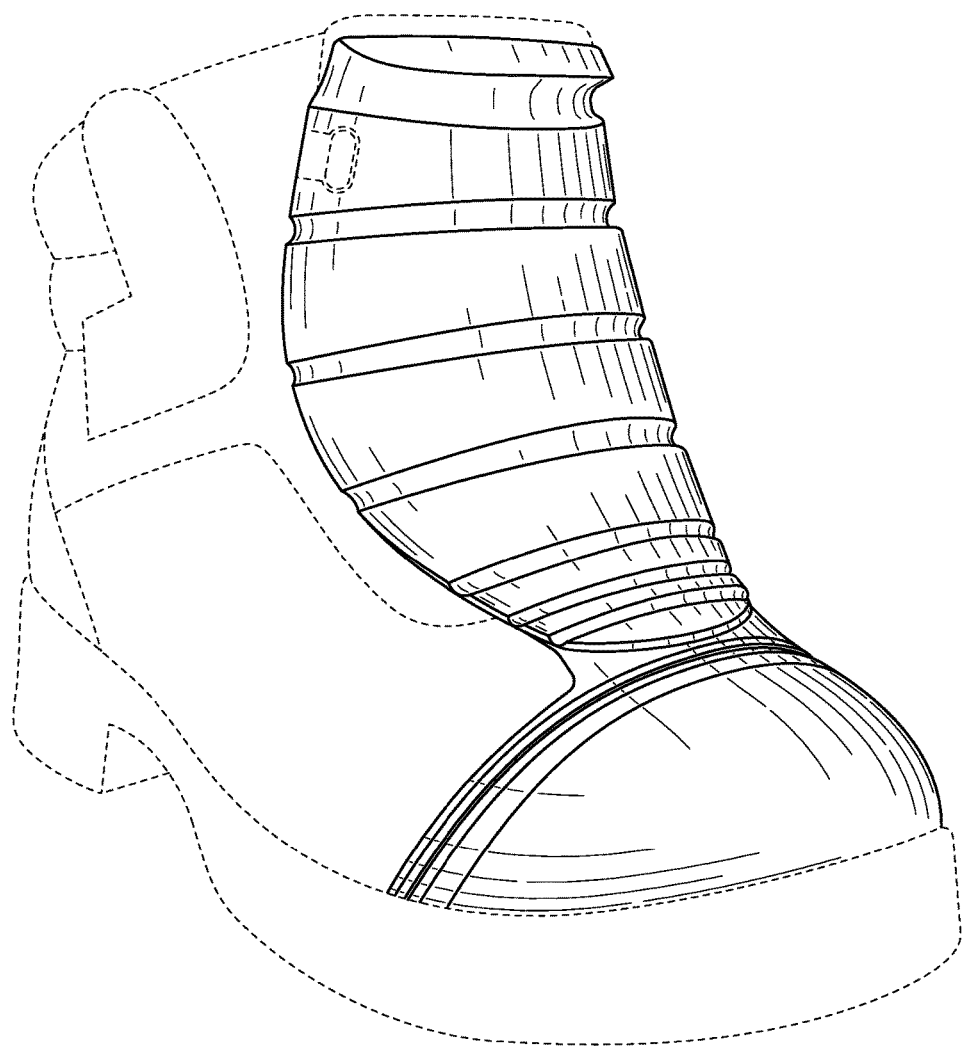
FIGS. 12A-E include perspective, front, right lateral, left lateral, and top views of a further example of an external metatarsal guard and toe cap according to aspects of the technology.
Figure 12B:
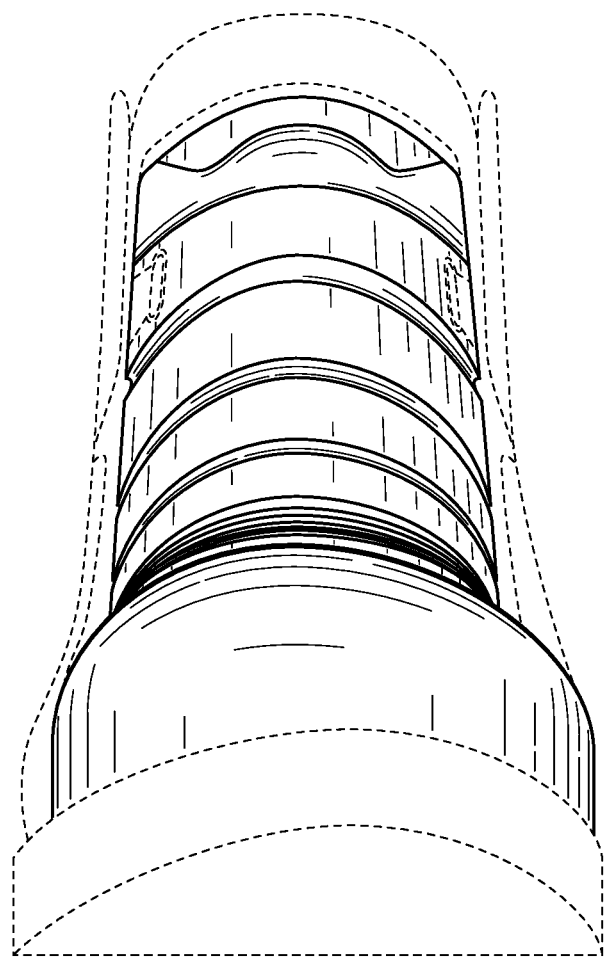
Figure 12C:
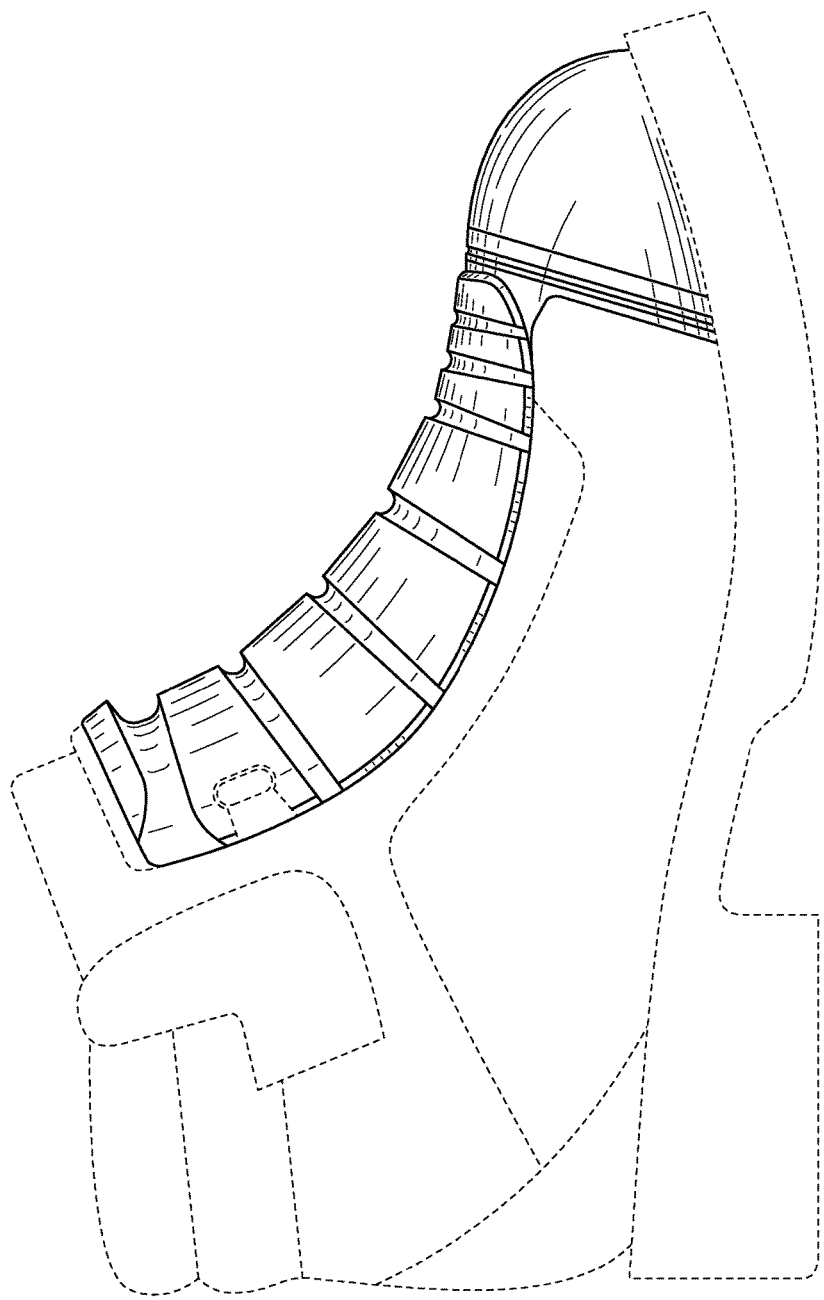
Figure 12D:
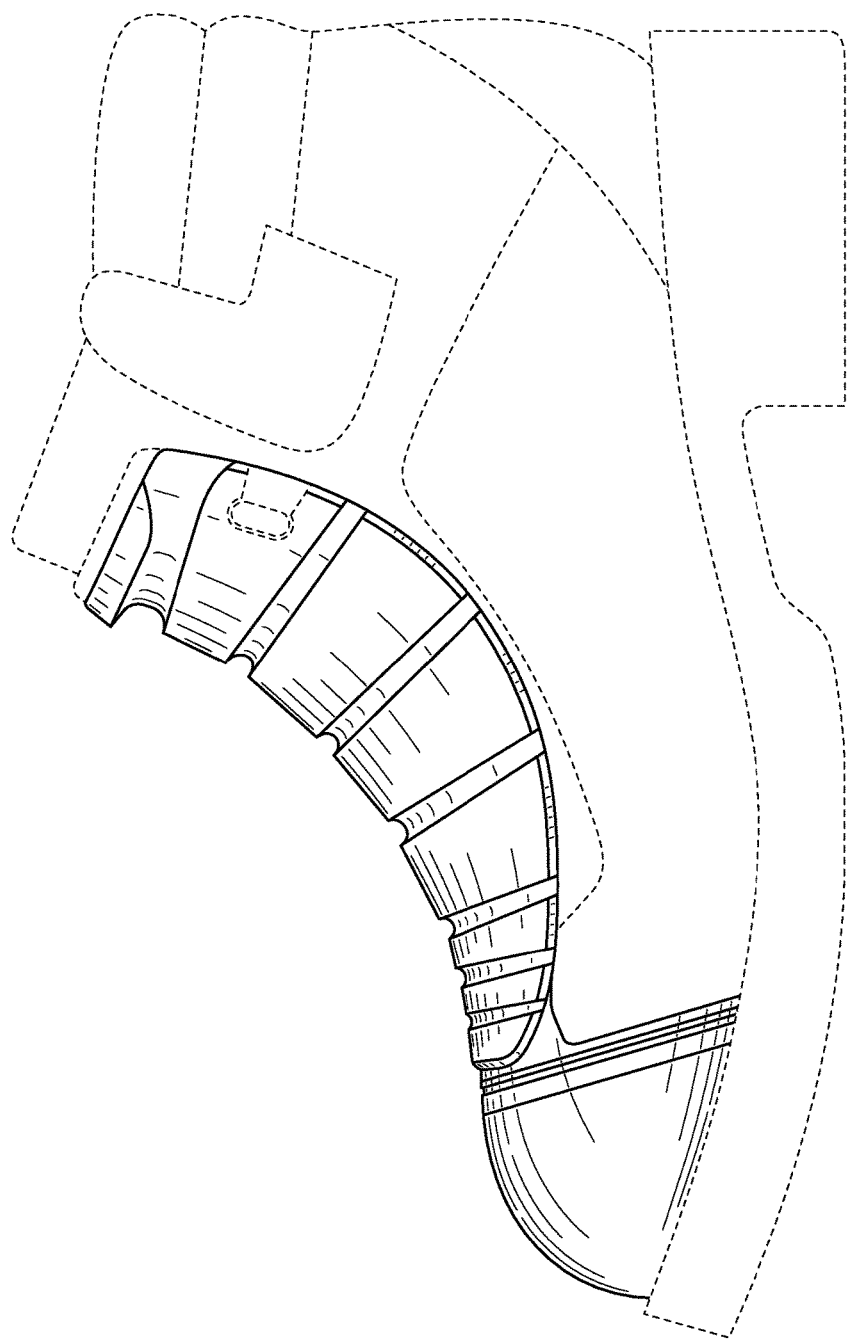
Figure 12E:
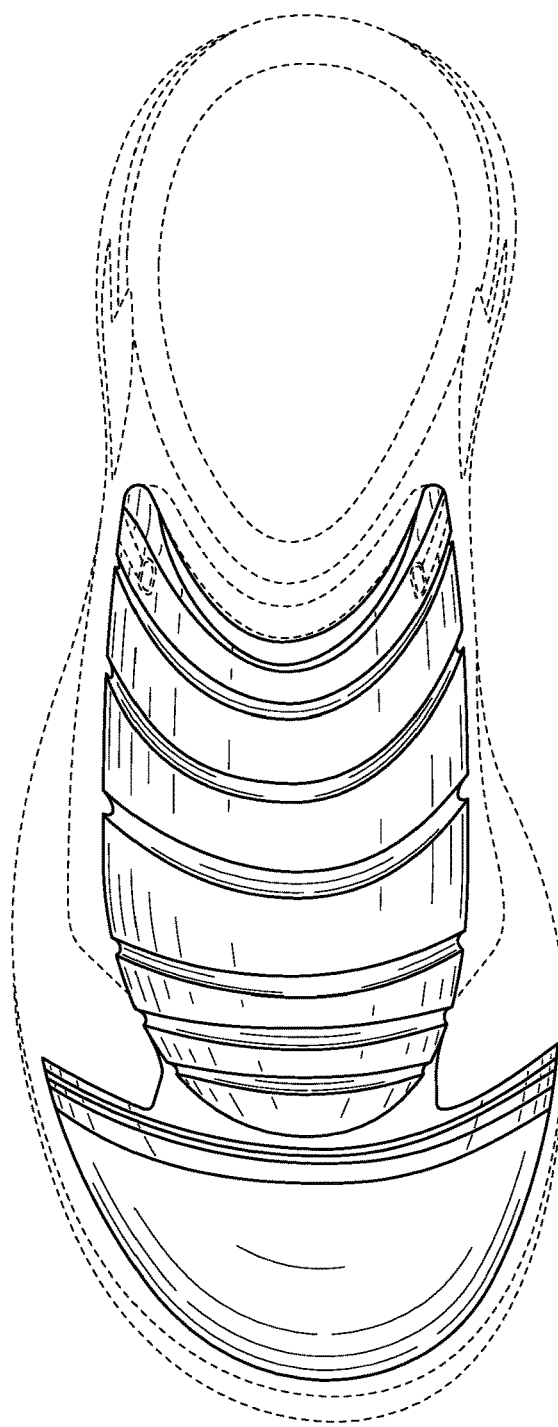
Figure 13A:
FIGS. 13A-E include perspective, front, right lateral, left lateral, and top views of yet another example of an external metatarsal guard and toe cap according to aspects of the technology.
Figure 13B:
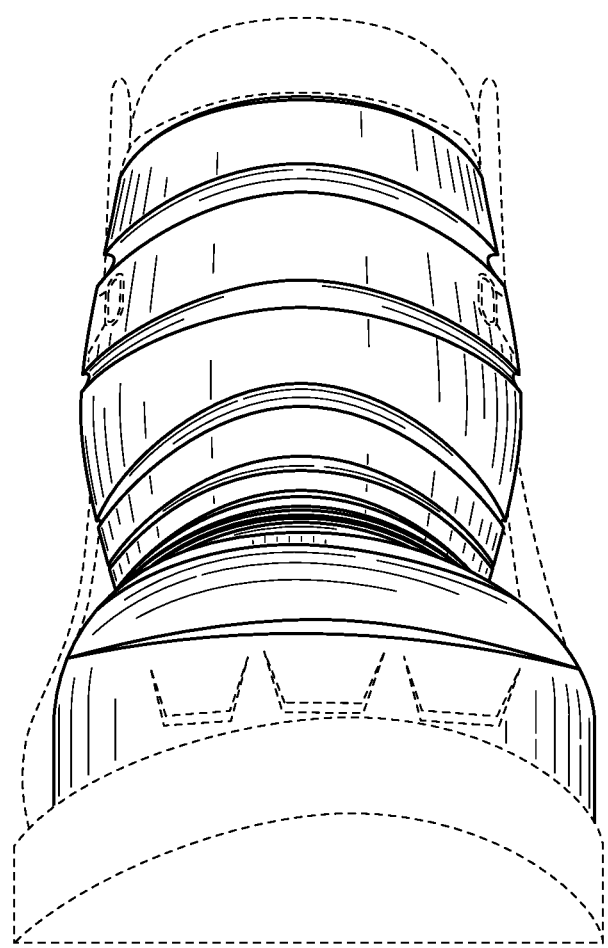
Figure 13C:
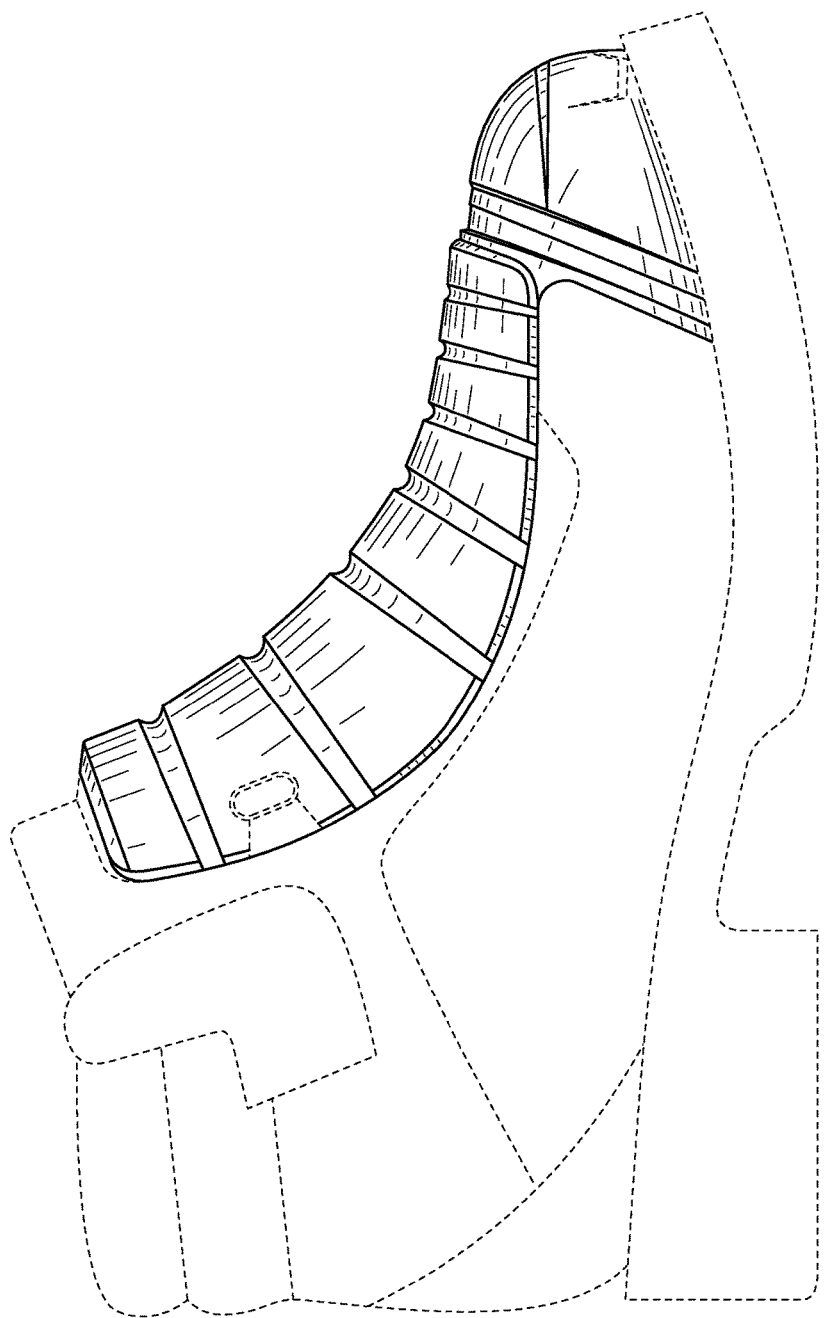
Figure 13D:
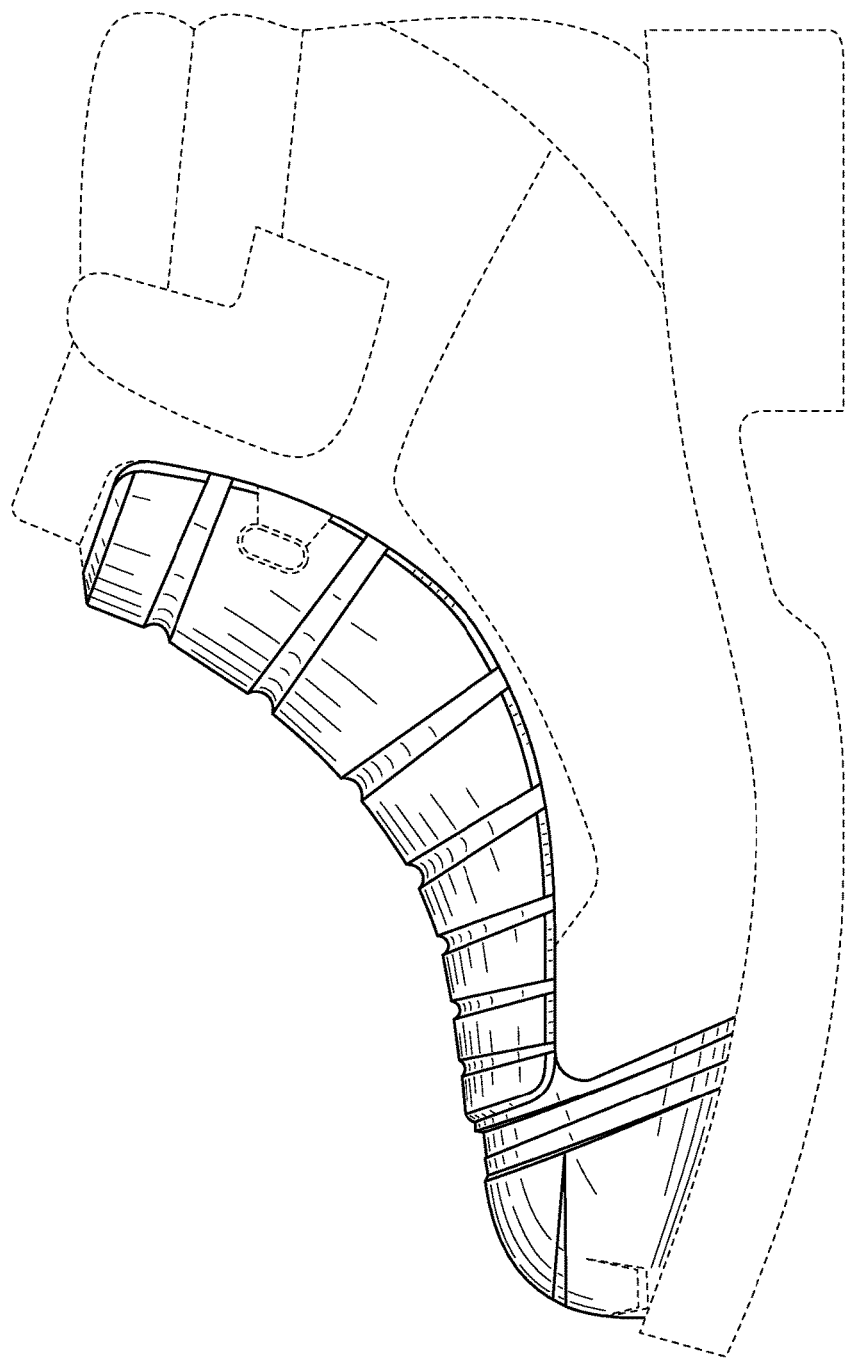
Figure 13E:
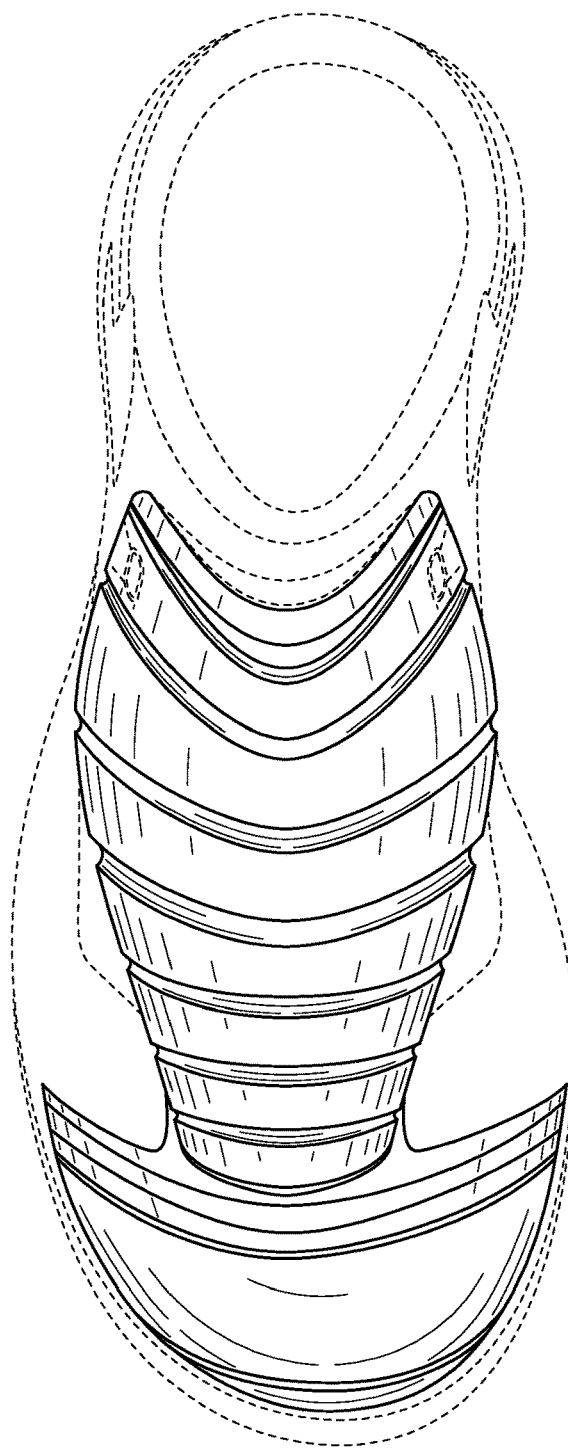

Now referring to FIGS. 10A-E, a protective device 900 is illustrated as a part of an upper 1000 of a shoe 1010. FIGS. 10A-E further illustrate how a protective device 900 may be incorporated into the upper 1000 of the shoe 1010 and provide protection to both the metatarsal region as well as the toe region of the foot. More particularly, FIG. 10A illustrates a perspective view of the upper 1000 incorporating the device 900, FIG. 10B illustrates a front view of the upper 1000 incorporating the device 900, FIG. 10C illustrates a lateral view, FIG. 10D illustrates a medial view, and FIG. 10E illustrates a top view. Likewise, FIGS. 11A-E illustrate another protective device 1100 incorporated into the upper 1000 of the shoe 1010. More particularly, FIG. 11A illustrates a perspective view of the upper 1000 incorporating the device 1100, FIG. 11B illustrates a front view, FIG. 11C illustrates a lateral view, FIG. 11D illustrates a medial view, and FIG. 11E illustrates a top view. As shown, while the protective device 1100 is similar to the protective device 900 in most other aspects, the protective device 1100 further includes a series of projections or tabs 1110 defined on the toe cap 920. The projections or tabs 1110 provide further material on the toe cap to absorb impact forces.

While FIGS. 10A-E illustrate the protective device 900 with eyelets and eyelet loops, FIGS. 12A-12E illustrate a variation of the protective device without the eyelets and eyelet loops. Likewise, FIGS. 13A-13E illustrate a variation of the protective device of FIGS. 11A-11E but without the eyelets and eyelet loops and without the projection tabs.

In the devices depicted in the figures, particular structures are shown that are adapted for use in a shoe, such devices serving to protect the foot of a user of the shoe. The use of alternative structures for such purposes, including structures having different lengths, shapes, and configurations is also contemplated. As an example, other variants of an internal metatarsal guard beyond those discussed above are contemplated. For instance, it is contemplated that, in place of protective layer 60 in several embodiments, may be a non-patterned and cross-shaped rigid layer (not shown). In other words, a rigid layer of material may be provided, which is roughly the same shape as protective layer 60 (FIGS. 3A-J), but such layer may not include a pattern of hexagons thereon. This protective layer may, in some instances, be combined with an embodiment of internal metatarsal guard 30 shown in FIGS. 2A-J. In particular, the aforementioned cross-shaped rigid layer may be combined with an internal metatarsal guard 30 having a top surface 32 that is smooth or non-patterned, such top surface 32 further including a recess (not shown) to accommodate the rigid layer. To be exact, it is contemplated that the cross-shaped rigid layer may be disposed within the recess (not shown) in guard 30 to provide additional protection against impact or other injuring events in that area.

As another example, the aforementioned cross-shaped rigid layer may be used with internal metatarsal guard 90 shown in FIGS. 4A-I. Specifically, such cross-shaped rigid layer may be situated within cross-shaped recess 102 in internal metatarsal guard 90 and be cemented or otherwise adhered therein. Thus, the non-patterned rigid layer, in this embodiment, may provide increased protection for a user's foot during use.

Yet another embodiment may include substituting or replacing one of metatarsal guards 30, 90 with a non-patterned cushioning layer. Further, in these embodiments, the non-patterned cushioning layer may include, in a recess formed in the cushioning layer, a protective layer 60 according to FIGS. 3A-J. Protective layer 60, due to its cross-shape, may therefore be situated within a cross-shaped recess (not shown) formed in the non-patterned cushioning layer. Other configurations of internal and external metatarsal guards beyond those noted above are also contemplated.

While not explicitly detailed in preceding sections, it is also contemplated that the internal metatarsal guard(s) discussed above may be integrally attached with the upper 12 of shoe 10, or such guard(s) may be separable therefrom. The same is true for the external guard(s) detailed above (e.g., such guard(s) may be integrally attached to the internal pocket of flap 124 of shoe 110 or be separable therefrom). Thus, different internal and external metatarsal guards may be substituted for one another within shoes 10, 110, respectively, thereby allowing a user the choice of which guard to use. Alternatively, as noted above, the aforementioned guards may be integrally attached with shoes 10, 110, which would not allow a user to remove or substitute guards.

As another example, although the metatarsal protection devices detailed herein are predominantly convex in a longitudinal direction and concave in a medial-lateral direction, other curvatures and shapes are contemplated. Such alternate curvatures and/or shapes may also lend themselves to providing protection for other areas of a user's foot, or for other areas of the body. Indeed, it is contemplated that aspects of the aforementioned metatarsal protection devices may be utilized in other areas of a shoe to provide protection for other areas of a user's foot, such as, for example, in the heel or side of the shoe. If used for these purposes, the metatarsal protection devices disclosed herein may be modified in shape and contour to conform to the area of the foot being protected.

Likewise, it is contemplated that aspects of the aforementioned protection devices may be used to protect other areas of a user's body, such as, for example, the knee, elbow, etc. In particular, protective devices having the different layers of material and varying patterns discussed above may situated within a housing and be adapted to overly a surface of the user's body, such that the applicable device could protect the relevant portion of the body from injury. An example of this may be a knee or elbow guard, which utilizes at least one of the embodiments discussed above for protective purposes. In this manner, a user may be provided with several protective devices that are usable to shield varying portions of the body (e.g., including, but not limited to, the foot, knee, elbow, etc.)

Aspects of the present invention(s) may also be utilized in other areas beyond footwear protection. For instance, a protective device for a cell phone, computer, or other electronic device may be manufactured using several of the concepts detailed above. To be exact, an electronic device cover may be constructed using the above-noted technology, such cover including an inner surface or pocket for housing the device, and an outer surface for protecting the device from damage. In some embodiments, the electronic device cover may be composed of a foam or other material providing cushioning characteristics, and such foam or other material may include a pattern of cones or hexagons as hereinbefore described with reference to the figures.

For instance, in one embodiment, an inner surface of the electronic device cover may be relatively smooth, and an outer surface of the cover may have a pattern of cones or hexagons formed thereon to provide protection for the electronic device (e.g., from damage due to impact with another object, etc.) Alternatively, both the interior and exterior surfaces of the electronic device cover may include a pattern of cones or hexagons similar to that set forth above. In still another embodiment, it is contemplated that such pattern of cones or hexagons may only be formed on the interior of the cover, while the exterior may be relatively smooth. Thus, a number of combinations related to an electronic device cover are possible, the end result being a cover that protects the applicable device from damage via the various qualities of the cone and/or hexagon pattern formed on the cover. Such device cover, in some embodiments, may also conform generally to the shape of the device being protected (e.g., computer, iPod, cell phone, iPad, tablet, etc.)

Although aspects of the invention(s) herein have been described with reference to particular embodiments, it is to be understood that these embodiments are merely illustrative of aspects of the present invention(s). It is therefore to be understood that numerous modifications may be made to the illustrative embodiments and that other arrangements may be devised without departing from the spirit and scope of the present invention(s) as defined by the appended claims.

It will also be appreciated that the various dependent claims and the features set forth therein can be combined in different ways than presented in the initial claims. It will also be appreciated that the features described in connection with individual embodiments may be shared with others of the described embodiments.

The invention claimed is:

1. An article of footwear, comprising:
   a sole having a first surface configured to support a wearer's foot and a second surface configured to contact a ground area;
   an upper affixed to the sole, the upper including an interior surface and an exterior surface opposite the interior surface, the interior surface and the first surface of the sole defining a receptacle for receiving the wearer's foot;
   an external protection device incorporated along the exterior surface of the upper, the external protection device being positioned to protect at least a metatarsal region of the wearer's foot; and
   a toe cap extending along a toe region of the upper, the toe cap being integral with the external protection device,
   wherein the external protection device is formed of a first layer of material adjacent to the interior surface of the upper and a second layer of material disposed adjacent the exterior surface of the upper, and
   wherein one end of the toe cap is sandwiched between the first layer of material and the second layer of material.

2. The article of footwear of claim 1, wherein the toe cap and the external protection device are integrally formed by injection molding.

3. The article of footwear of claim 1, wherein at least one of the first and second layers of material is integrally formed with the toe cap.

4. The article of footwear of claim 1, wherein the first layer of material has first and second opposing surfaces and a series of frustum-shaped recesses formed along at least one of the first and second surfaces.

5. The article of footwear of claim 1, wherein second layer of material of the external protection device includes a plurality of pads separated by a corresponding series of grooves.

6. The article of footwear of claim 5, wherein each of the series of grooves extend in a medial-lateral direction along the upper.

7. The article of footwear of claim 1, wherein the toe cap and the external protection device are integrally joined by a hinge member.

8. An article of apparel, comprising:
   a housing sized to retain a protection device, the housing being arranged for placement adjacent to a portion of a body of a user during wear; and
   a protection device positioned within the housing and extending along a longitudinal axis, the protection device comprising:
      a first layer of material having first and second opposing surfaces and a series of cushioning elements formed along at least one of the first and second surfaces; and
      a second layer of material attached to the first layer, the second layer having a first surface and a second surface, the second surface of the second layer abutting the first surface of the first layer, the first surface of the second layer having a plurality of grooves defined thereon, the first layer being shaped to conform to the portion of the user's body, such that the protection device is arranged to provide protection for the portion of the user's body against injurious events, wherein the first and second layers are injection-molded layers,
   wherein a first distance between two ones adjacent of the plurality of grooves proximal to a first end of the protection device is smaller than a second distance between two adjacent of the plurality of grooves distal to the first end of the protection device.

9. An article of apparel according to claim 8, the plurality of grooves extending along a lateral axis perpendicular to the longitudinal direction.

10. The article of apparel according to claim 8, further comprising:
   a connecting element extending from at least one of the first and second layers; and
   a toe cap connected to the connecting element and disposed remote from the protection device.

11. An article of apparel, comprising:
   a housing sized to retain a protection device, the housing being arranged for placement adjacent to a portion of a body of a user during wear; and
   a protection device positioned within the housing and extending along a longitudinal axis, the protection device comprising:
      a first layer of material having first and second opposing surfaces and a series of cushioning elements formed along at least one of the first and second surfaces; and
   a second layer of material attached to the first layer, the second layer having a first surface and a second surface, the second surface of the second layer abutting the first surface of the first layer, the first surface of the second layer having a plurality of grooves defined thereon, the first layer being shaped to conform to the portion of the user's body, such that the protection device is arranged to provide protection for the portion of the user's body against injurious events, wherein the first and second layers are injection-molded layers,
   wherein distances between two adjacent ones of the plurality of grooves increase along the longitudinal axis from a proximal end to a distal end of the protection device.

12. The article of apparel according to claim 11, the plurality of grooves extending along a lateral axis perpendicular to the longitudinal direction.

13. The article of apparel according to claim 11, further comprising:
   a connecting element extending from at least one of the first and second layers; and
   a toe cap connected to the connecting element and disposed remote from the protection device.

14. An article of apparel, comprising:
   a housing sized to retain a protection device, the housing being arranged for placement adjacent to a portion of a body of a user during wear; and
   a protection device positioned within the housing and extending along a longitudinal axis, the protection device comprising:
      a first layer of material having first and second opposing surfaces and a series of cushioning elements formed along at least one of the first and second surfaces; and
   a second layer of material attached to the first layer, the second layer having a first surface and a second surface, the second surface of the second layer abutting the first surface of the first layer, the first surface of the second layer having a plurality of grooves defined thereon, the first layer being shaped to conform to the portion of the user's body, such that the protection device is arranged to provide protection for the portion of the user's body against injurious events, wherein the first and second layers are injection-molded layers, wherein a depth of each of the plurality of grooves increases along the longitudinal axis from a proximal end to a distal end of the protection device.

15. The article of apparel according to claim 14, the plurality of grooves extending along a lateral axis perpendicular to the longitudinal direction.

16. An article of apparel, comprising:
a housing sized to retain a protection device, the housing being arranged for placement adjacent to a portion of a body of a user during wear;
a protection device positioned within the housing, the protection device comprising a first injection-molded layer of a first material abutting a second injection-molded layer of a second material, wherein the second layer of material includes first and second opposing surfaces, the first layer of material being shaped to conform to the portion of the user's body to provide protection against injurious events; and
an injection molded toe cap extending from at least one of the first and second layers,
wherein one end of the toe cap is sandwiched between the first layer of material and the second layer of material.

17. The article of apparel according to claim 16, wherein the toe cap is injection molded with at least one of the first and second layers.

18. The article of apparel according to claim 16, further comprising a hinge element extending between the toe cap and at least one of the first and second layers.

19. The article of apparel according to claim 16, further comprising a plurality of projections defined along an exterior surface of the toe cap.

20. The article of apparel of claim 16, wherein the injection molded toe cap is formed of a third material different from the first and second materials.

* * * * *